United States Patent
Chaudhuri et al.

(10) Patent No.: US 9,602,021 B2
(45) Date of Patent: Mar. 21, 2017

(54) HYBRID HIGH VOLTAGE DIRECT CURRENT CONVERTER SYSTEM AND METHOD OF OPERATING THE SAME

(71) Applicant: General Electric Company, Schenectady, NY (US)

(72) Inventors: Nilanjan Ray Chaudhuri, Niskayuna, NY (US); Ranjan Kumar Gupta, Schenectady, NY (US); Einar Vaughn Larsen, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 385 days.

(21) Appl. No.: 14/201,062

(22) Filed: Mar. 7, 2014

(65) Prior Publication Data

US 2015/0256094 A1  Sep. 10, 2015

(51) Int. Cl.
*H02J 3/36* (2006.01)
*H02M 5/458* (2006.01)
*H02M 7/757* (2006.01)

(52) U.S. Cl.
CPC ............ *H02M 5/4585* (2013.01); *H02J 3/36* (2013.01); *H02M 7/7575* (2013.01); *Y02E 60/60* (2013.01)

(58) Field of Classification Search
CPC ....... H02M 5/4585; H02M 7/7575; H02J 3/36
USPC .......................................................... 363/35
See application file for complete search history.

(56) References Cited

U.S. PATENT DOCUMENTS

| | | | |
|---|---|---|---|
| 3,959,719 A | 5/1976 | Espelage | |
| 4,263,517 A | 4/1981 | Konishi | |
| 4,517,635 A | 5/1985 | Kelley, Jr. | |
| 5,202,583 A | 4/1993 | Larsen et al. | |
| 5,535,113 A | 7/1996 | Konishi | |

(Continued)

FOREIGN PATENT DOCUMENTS

| | | |
|---|---|---|
| CN | 1832318 A | 9/2006 |
| CN | 101976836 A | 2/2011 |

(Continued)

OTHER PUBLICATIONS

International Search Report and Written Opinion, dated Jun. 29, 2015, for co-pending International Application No. PCT/US2015/018224 (17 pgs).

(Continued)

*Primary Examiner* — Adolf Berhane
*Assistant Examiner* — Afework Demisse
(74) *Attorney, Agent, or Firm* — Nitin N. Joshi

(57) ABSTRACT

A hybrid HVDC converter system includes a DC bus, at least one capacitor commutated converter (CCC) and at least one self-commutated converter (SCC) coupled in series through the DC bus. The CCC induces a first voltage on the DC buses, the SCC induces a second voltage on the DC bus, the first voltage and the second voltage are summed to define a total DC voltage. The method includes at least one of regulating the total DC voltage induced on the DC buses including regulating the first DC voltage through the CCC and regulating the second DC voltage through the SCC substantially simultaneously, regulating the total DC voltage induced on the DC bus including regulating the second DC voltage through the SCC, and regulating the total DC voltage induced on the DC bus including regulating the first DC voltage through the CCC.

20 Claims, 11 Drawing Sheets

(56) References Cited

U.S. PATENT DOCUMENTS

| | | | |
|---|---|---|---|
| 5,751,563 | A | 5/1998 | Bjorklund |
| 5,910,889 | A | 6/1999 | Larsen et al. |
| 6,108,223 | A | 8/2000 | Julian et al. |
| 6,963,187 | B2 | 11/2005 | Bebic et al. |
| 8,030,791 | B2 | 10/2011 | Lang et al. |
| 8,203,586 | B2 | 6/2012 | Kaneko et al. |
| 8,300,435 | B2 | 10/2012 | Bjorklund et al. |
| 8,498,133 | B2 | 7/2013 | Papafotiou et al. |
| 8,830,712 | B2* | 9/2014 | Fischer De Toledo ... H02J 3/16 363/138 |
| 8,847,430 | B2 | 9/2014 | Juhlin |
| 8,934,268 | B2* | 1/2015 | Trainer ............. H02J 3/36 323/205 |
| 2007/0216390 | A1 | 9/2007 | Wai et al. |
| 2009/0279328 | A1 | 11/2009 | Jiang-Hafner |
| 2010/0309698 | A1 | 12/2010 | Asplund et al. |
| 2011/0310641 | A1 | 12/2011 | Asplund et al. |
| 2012/0043923 | A1 | 2/2012 | Ikriannikov et al. |
| 2012/0092904 | A1 | 4/2012 | Nuqui et al. |
| 2012/0250371 | A1 | 10/2012 | Fischer De Toledo |
| 2013/0063981 | A1 | 3/2013 | Dujic et al. |

FOREIGN PATENT DOCUMENTS

| | | |
|---|---|---|
| CN | 102394557 A | 3/2012 |
| CN | 102449870 A | 5/2012 |
| CN | 102738819 A | 10/2012 |
| CN | 102904242 A | 1/2013 |
| CN | 102969732 A | 3/2013 |
| CN | 103023058 | 4/2013 |
| EP | 2556585 A1 | 2/2013 |
| WO | 9522848 A1 | 8/1995 |
| WO | 2010069371 A1 | 6/2010 |
| WO | 2011124258 A1 | 10/2011 |
| WO | 2011124260 A1 | 10/2011 |
| WO | 2011134521 A1 | 11/2011 |
| WO | 2012130296 A1 | 10/2012 |
| WO | 2013071975 A1 | 5/2013 |
| WO | 2013079937 A2 | 6/2013 |
| WO | 2014158514 A1 | 10/2014 |

OTHER PUBLICATIONS

Agelidis et al., "Recent Advances in High-Voltage Direct Current Power Transmission Systems," Industrial Technology, Dec. 2006, pp. 206-213.

Yang et al., "Study on Capacitor Commutated Converter Applied in HVDC projects," Power Engineering Society General Meeting, IEEE, Jun. 2007, pp. 1-5.

Flourentzou et al., "VSC-Based HVDC Power Transmission Systems: An Overview," IEEE Transactions on Power Electronics, vol. 24, No. 3, Mar. 2009, pp. 592-602.

Torres-Olguin et al., "Integration of Offshore Wind Farm Using a Hybrid HVDC Transmission Composed by the PWM Current-Source Converter and Line-Commutated Converter," IEEE Transactions on Energy Conversion, vol. 28, No. 1, Mar. 2013, pp. 125-134.

Zhang et al., "Hybrid Multilevel Converter: Capacitor Voltage Balancing Limits and its Extension," IEEE Transactions on Industrial Informatics, vol. 9, No. 4, Nov. 2013, pp. 2063-2073.

Feldman, et al., "A Hybrid Modular Multilevel Voltage Source Converter for HVDC Power Transmission," IEEE Transactions on Industry Applications, vol. No. 49, Issue No. 4, pp. 1577-1588, Jul.-Aug. 2013.

Lin et al., "Adaptive Voltage Regulation and Equal Current Distribution of Parallel-Buck DC-DC Converters Using Backstepping Sliding Mode Control", 30th Annual Conference of IEEE, vol. No. 2, pp. 1018-1023, Nov. 2-6, 2004.

Weihao et al., "Modeling and Control of Zero-Sequence Current in Multiple Grid Connected Converter", Power Electronics Specialists Conference, pp. 2064-2069, Jun. 15-19, 2008.

Torres et al., "A Model-based Controller in Rotating Reference Frame for Hybird HVDC", Energy Conversion Congress and Expasition (ECCE), pp. 1578-1584, Sep. 12-16, 2010.

PCT Search Report and Written Opinion issued in connection with corresponding PCT Application No. PCT/US2015/018015 on Jun. 11, 2015.

Qahraman B et al, "Hybrid HVDC Converters and Their Impact on Power System Dynamic Performance," 2006 IEEE Power Engineering Society General Meeting; Jun. 18-22, 2006; Montreal, Que.'Canada, IEEE, Piscataway, NJ' USA, Jun. 18, 2006 (Jun. 18, 2006), pp. 1-6.

Andersen B R et al: "Hybrid HVDC system for power transmission to island networks", 2003 IEEE PES Transmission and Distribution Conference. Conference Proceedings. Dallas, TX, Sep. 7-12, 2003; [IEEE/PES Transmission and Distribution Conference and Exposition], New York, NY : IEEE, US, vol. 1, Sep. 7, 2003 (Sep. 7, 2003), pp. 55-60.

Hongbo Jiang et al: "Harmonic Cancellation of a Hybrid Converter", IEEE Transactions on Power Delivery, IEEE Service Center, New York, NY, US, vol. 13 , No. 4, Oct. 1, 1998 (Oct. 1, 1998), pp. 1291-1296.

Mohamed H Okba et al: "Harmonics in HVDC Links, part II Effects and reduction techniques", IECON 2012—38th Annual Conference on IEEE Industrial Electronics Society, IEEE, Oct. 25, 2012 (Oct. 25, 2012), pp. 1328-1336.

International Search Report, dated Jun. 5, 2014, for International application No. PCT/US2014/017587, filed Feb. 21, 2014 (15 pgs.).

Honglin Zhou, et al. Control of DFIG-Based Wind Farms with Hybrid HVDC Connection, IEEE, 2009, pp. 1085-1091.

Y. Li, et al., A Class a New HVDC Transmission Modes Improved by Inductive Filtering Methods, Internation Conference on Power System Technology, 2010, pp. 1-7.

Behazad Qahraman, Series/Parallel Hybrid VSC-LCC for HVdc Transmission Systems, Department of Electrical and Computer Engineering, Univesity of Manitoba, 2010, 171 pages.

Omar Kotb, A Hyrbrid LCC-VSC HVDC, University of Ontario Institute of Technology, 2010, 107 pages.

P.F. De Toledo, et al., Frequency Domain Model of an HVDC Link with a Line-Commutated Current-source Converter. Part 1: Fixed Overlap, IET Gener. Transm. Distrib., 2009, 757-770, vol. 3, iss. 8, The Institution of Engineering and Technology.

Luke Livermore, et al., MTDC VSC Technology and its Applications for Wind Power, 6 pages.

Capacitor Commutated Converter, CCC, 18 pages, ABB.

Menzies, Donald F., et al., "Garabi" the Argentina—Brazil 1000 MW Interconnection Commissioning and Early Operating Experience, ERLAC Conference, 2001, 5 pages.

Graham, John, et al., The Garabi 2000 MW Interconnection back-to-Back HVDC to Connect WEak AC Systems, ABB Utilities, 8 pages.

Andersen, Bjarne R., et al., Hybrid HVDC System for Power Transmission to Island Networks, IEEE Transcations on Power Delivery, 2004, 1884-1890, vol. 19, No. 4.

Barthurst G.N., et al., Harmonic Modelling of Networks Containing Line-Commutated Voltage-sourced Coverters, 14th PSCC, 2002, 7 pages, Session 28, Paper 1.

Qahraman, B. and Gole, A., "A VSC Based Series Hybrid Converter for HVDC Transmission," CCECE/CCGEI, Saskatoon, May 2005, pp. 458-461.

U.S. Appl. No. 13/826,583, filed Mar. 14, 2013, entitled High Voltage Direct Current (HVDC) Converter System and Method of Operating the Same.

U.S. Appl. No. 13/688,658, filed Nov. 29, 2012, entitled High Voltage Direct Current (HVDC) Converter System and Method of Operating the Same.

U.S. Appl. No. 13/629,882, filed Sep. 28, 2012 entitled Multilevel Converter System.

* cited by examiner

HYBRID HIGH VOLTAGE DIRECT CURRENT CONVERTER SYSTEM AND METHOD OF OPERATING THE SAME

BACKGROUND

The field of the invention relates generally to high voltage direct current (HVDC) transmission systems and, more particularly, to hybrid HVDC converter systems and a method of operation thereof.

At least some of known electric power generation facilities are physically positioned in a remote geographical region or in an area where physical access is difficult. One example includes power generation facilities geographically located in rugged and/or remote terrain, for example, mountainous hillsides, extended distances from the customers, and off-shore, e.g., off-shore wind turbine installations. More specifically, these wind turbines may be physically nested together in a common geographical region to form a wind turbine farm and are electrically coupled to a common alternating current (AC) collector system. Many of these known wind turbine farms include a separated power conversion assembly, or system, electrically coupled to the AC collector system. Such known separated power conversion assemblies include a first converter station, i.e., a rectifier that converts the AC generated by the power generation facilities to direct current (DC). Such known assemblies also include a second converter station, i.e., an inverter that converts the DC to AC of a predetermined frequency and voltage amplitude. The first converter station is positioned in close vicinity of the associated power generation facilities and the second converter station is positioned in a remote facility, such as a land-based facility. Such first and second converter stations are typically electrically connected via submerged high voltage direct current (HVDC) electric power cables that at least partially define an HVDC transmission system.

Many of these known converter stations define an HVDC converter system and the converter stations include some combination of line commutated converters (LCCs) and capacitor commutated converters (CCCs). These converter stations typically use a control scheme that includes some combination of current control (CC) loops, voltage control (VC) loops, and voltage dependent current order limits (VDCOLs). For example, the control scheme for the first converter station may include a CC loop and a VDCOL and the control scheme for the second converter station may include a margin control scheme, i.e., a combination of a CC loop with a VDCOL and a parallel VC loop, where the larger of the voltage commands and the current commands are used. Since the values of the commands are variable, the control scheme for the second converter station my shift modes between the CC loop and the VC loop on a frequent basis, thereby increasing a probability of system instability. Also, the use of VDCOLs may increase the frequency of the control loops hitting a limit without any further bandwidth to facilitate control, thereby increasing the probability of control overshoots and undershoots.

Also, many known HVDC converter systems include a large number of capacitor banks, AC harmonic filters, and DC-side harmonic filters (for filtering out DC-ripple) installed in the associated AC switchyards to compensate for harmonic currents and reactive power. In addition, such capacitor banks require associated electrical switchgear for placing the banks in service and removing them from service. Such capacitor banks, associated switchgear, and AC and DC harmonic filters are capital-intensive due to the land required and the amount of large equipment installed. In addition, a significant investment in replacement parts and preventative and corrective maintenance activities increases operational costs.

In addition, many known control systems for converter stations facilitate commutation margin angles, i.e., extinction angles to fall below predetermined thresholds. Therefore, increased reactive power flow, commutation failure, and lower margins to recovery from DC system disturbances may become more probable.

BRIEF DESCRIPTION

In one aspect, a method for controlling a hybrid high voltage direct current (HVDC) converter system is provided. The hybrid HVDC converter system including at least one direct current (DC) bus, at least one capacitor commutated converter (CCC), and at least one self-commutated converter (SCC). The at least one CCC and the at least one SCC are coupled in series to the at least one DC bus. The at least one CCC is configured to induce a first voltage on the at least one DC bus and the at least one SCC is configured to induce a second voltage on the at least one DC bus. The first voltage and the second voltage are summed to define a total DC voltage induced on the at least one DC bus. The method includes at least one of regulating the total DC voltage induced on the DC buses including regulating the first DC voltage through the CCC and regulating the second DC voltage through the SCC substantially simultaneously, regulating the total DC voltage induced on the DC buses including regulating the second DC voltage through the SCC, and regulating the total DC voltage induced on the DC buses including regulating the first DC voltage through the CCC.

In a further aspect, a method for controlling a hybrid high voltage direct current (HVDC) converter system is provided. The hybrid HVDC converter system includes at least one alternating current (AC) bus, at least one direct current (DC) bus, at least one capacitor commutated converter (CCC), and at least one self-commutated converter (SCC). The at least one CCC and the at least one SCC are coupled in series to at least one DC bus. The at least one CCC is configured to induce a first voltage on the at least one DC bus and the at least one SCC is configured to induce a second voltage on the at least one DC bus. The first voltage and the second voltage are summed to define a total DC voltage induced on the at least one DC bus. The method includes operating the hybrid HVDC converter system during steady-state operating conditions including regulating the at least one CCC to induce the first voltage on the at least one DC bus at a value substantially similar to the total DC voltage. the method also includes regulating the at least one SCC to induce the second voltage on the at least one DC bus at a residual voltage that is substantially equal to the total DC voltage minus the first voltage, thereby using the at least one SCC to finely regulate at least one of current and voltage on at least one of the at least one AC bus and the at least one DC bus.

DRAWINGS

These and other features, aspects, and advantages of the present invention will become better understood when the following detailed description is read with reference to the accompanying drawings in which like characters represent like parts throughout the drawings, wherein.

Figure 1:
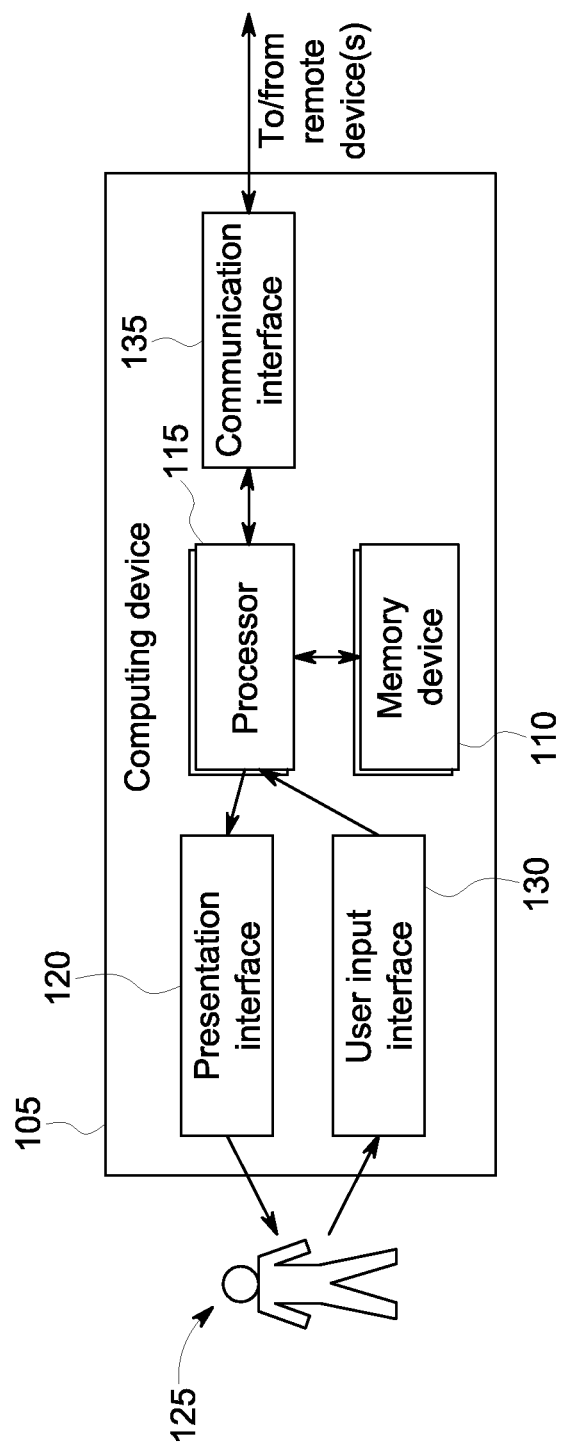
FIG. 1 is a block diagram of an exemplary computing device.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "black start" refers to providing electric power to at least one power generation facility in a geographically-isolated location from a source external to the power generation facility. A black start condition is considered to exist when there are no electric power generators in service in the power generation facility and there are no other sources of electric power in the geographically-isolated power generation facility to facilitate a restart of at least one electric power generator therein.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments of control systems for high voltage direct current (HVDC) converter systems and associated HVDC transmission systems include a self-commutated converter (SCC) coupled to a capacitor commutated converter (CCC). The exemplary embodiments describe the SCCs and CCCs as including a plurality of semi-conductor based switches. Specifically, the SCCs include insulated gate bipolar transistors (IGBTs) and the CCCs include thyristors. The combination of the SCC (vernier) and the CCCs regulate the DC voltage ($V_{DC}$) on the DC-side of the converters within established parameters. The physical size and ratings of the SCC is much smaller than those of the CCCs. As such, the CCCs generate a thyristor voltage ($V_{th}$) that makes up the majority of total DC voltage induced ($V_T$) and the SCC generates a much smaller voltage. Therefore, the CCCs act to exercise broad control of $V_T$ and the SCC exercises narrow, or vernier control of $V_T$ and generates a $V_{vernier}$. The sum of $V_{vernier}$ and $V_{th}$ is $V_T$, and $V_T$ is regulated to provide for predetermined values of $V_{DC}$ after accounting for the voltage drop across the transmission system. For those HVDC transmission systems with two converter systems, i.e., one converter system on each end of the HVDC transmission system, $V_{DC}$ for the HVDC transmission system is controlled by only one of the two converter systems to regulate current transmission through the HVDC transmission system, i.e., $I_{DC}$.

In the exemplary embodiments described herein, the converter control systems include at least one of a current control (CC) loop that generates $V_{cmd-CC}$ control signals and a voltage control (VC) loop that generates $V_{cmd-VC}$ control signals to regulate $V_{DC}$, and therefore, $I_{DC}$ through subsequent generation of firing command signals to the thyristors and the IGBTs. These firing command signals are proportioned between the SCC and CCCs to regulate each of $V_{vernier}$ and $V_{th}$ in the appropriate proportions. In addition, these control signals are generated with limits that are determined as a function of measurable feed-forward and feedback signals, i.e., real-time system conditions that include converter system DC-side voltages and currents. Use of such feed-forward and feedback signals facilitates maintaining control system signal limits such that the probability of hitting these limits is significantly reduced, thereby facilitating smoother control. Also, the use of such feed-forward and feedback signals reduces the potential for mode shifts between the CC loops and the VC loops. Further, in the event a control limit is reached, thereby at least temporarily slowing firing control of the thyristors and IGBTs, effective control is restored once the limits are adjusted and/or the command signals move away from the limits. Further, in the event of large disturbances on the HVDC transmission system, or in the event of a mode shift between CC and VC, accelerated recovery is facilitated through the use of the feed-forward and feedback signals.

As discussed above, the control systems described herein include shared control between the SCC and the CCCs during steady state and dynamic conditions, including significant transients on the HVDC transmission system. Such coordinated control facilitates reducing undershoots and overshoots of control actions in response to the dynamic conditions. To achieve such results, the dynamic ratings of the SCC and CCCs are reduced through the use of control mechanisms that include integrators with upper and lower parameter setpoints, thereby also reducing the potential for firing angle control signals from hitting a limit. Also, reducing the hitting of control limits facilitates extending the operation of the SCC through a linear control region, thereby increasing the range, i.e., operational bandwidth of fine control during transient conditions. If the range of operational bandwidth needed is outside of the range of control of the SCC, incremental operation of the CCCs is executed such that a margin to the limits is increased and adequate linear, fine control through the SCC is returned, thereby facilitating a wider operational bandwidth of fine control.

The SCCs described herein include an AC-to-DC (AC/DC) converter stage coupled to a DC-to-DC (DC/DC) converter stage with a DC link therebetween. The DC link has an induced voltage thereon ($V_{DC\text{-}ver}$) and the control systems described herein facilitate regulating $V_{DC\text{-}ver}$ such that harmonics on the DC-side of the converter due to DC ripple effects are reduced.

Moreover, the control systems described herein facilitate regulating the extinction angles, sometimes referred to as commutation margin angles, associated with adjacently-firing thyristor valves. Specifically, during operation of a converter system as an inverter, a regulated extinction angle value is determined, i.e., estimated from extinction angle feedback measurements and extinction angle setpoints, and is used to regulate and/or limit the firing angle. Such extinction angle control facilitates reducing firing angle values to decrease a potential for commutation failure of the thyristor.

In addition to regulating the DC-side of the converter systems, the SCCs described herein also facilitate regulation of the AC-side of the converter systems. Specifically, the thyristor firing command signals during operation of a converter system as a rectifier are regulated to lower values to control the power factor on the AC-side to reduce the reactive power consumption by the rectification process. As such, a reduction in the size and number of capacitive devices required at the switchyard of the converter system is facilitated, thereby resulting in a smaller footprint for the converter system hardware. In addition to direct control of the firing angles, indirect control of the firing angles by setting a minimum value for the associated extinction angles further facilitates reducing reactive power consumption. Such direct and indirect control of the firing angle facilitates generating upper firing angle limits.

Also, the AC-side of the converter systems described herein is further regulated through the use of one of inner current control loops and positive and negative sequence current regulators to generate current command signals for regulating the AC/DC converter stage to decrease harmonics on the AC-side of the converter systems. Such current command signals are limited to the upper and lower current ratings of the converter systems as well as parameters established through transient control to facilitate maintaining DC link voltage $V_{DC\text{-}ver}$ during significant transients on the HVDC transmission system. To further facilitate transient ride-through, a DC voltage feedback signal is used to constrain commands to the SCC, thereby reducing a potential for sharp changes to the SCC command signals and facilitating a smoother transition through the transient.

Further, the control systems described herein facilitate regulating the value of the associated firing angles such that use of tap changing transformers is significantly reduced. Moreover, the control systems described herein facilitate regulating the operation of the CCCs such that the size and number of the associated capacitor banks and the associated switchgear is reduced, thereby decreasing the footprint of the converter systems and the costs of installation and maintenance thereof.

In addition, the control systems described herein facilitate a smooth ramp-down from control system limits and constraints during severe transients on HVDC transmission system and eventual blocking of regulating control signals to the DC/DC converter stage until the transient is at least arrested such that a subsequent smooth ramp-up, or recovery is facilitated. In some embodiments, DC link voltage $V_{DC\text{-}ver}$ may be held substantially constant to further mitigate the disturbance. These effects are enabled through a "bleeding" scheme that includes subtracting real-time SCC voltage feedback signals upstream of the associated integration modules, thereby regulating the SCC voltage away from the associated integrator module limits, thereby reducing the potential for sharp changes in the SCC command signals.

Moreover, use of integrators throughout the control systems described herein facilitates reducing accelerated reactions to disturbances on the HVDC transmission system, thereby further facilitating system stability. Also, the control systems described herein further facilitate reducing accelerated reactions to disturbances on the HVDC transmission system, thereby further facilitating system stability through using variable limits on at least some of the integrators above. These variable limits are a function of real-time system conditions as determined by, for example, and without limitation, HVDC transmission system voltages and currents, feed-forward signals such as SCC DC link voltage control current command signals, and equipment limitations such as minimum and maximum current ratings of the DC/DC converter stage.

Furthermore, the control systems described herein facilitate smooth normal operation and ride-through of severe disturbances on the HVDC transmission system through the use of Volt-VAR (Volt-Amperes Reactive) controls and SCC DC link voltage control by giving the SCC DC link voltage control over reactive power control through the Volt-VAR controls, thereby facilitating maintaining control of the DC link voltage at the expense of reactive power control.

Also, the control systems described herein facilitate black starts using the HVDC transmission systems described herein. Specifically, the bi-directional SCC controls the DC line current such that the DC/DC converter stage is charged which in turn energizes the DC link and the AC/DC converter stage such that the AC/DC converter stage generates sufficient AC power to at least partially energize the AC side.

FIG. 1 is a block diagram of an exemplary computing device 105 that may be used to perform monitoring and/or control of a high voltage direct current (HVDC) transmission system and, more specifically, an electric power conversion system (neither shown in FIG. 1). More specifically, computing device 105 monitors and/or controls any piece of equipment, any system, and any process associated with an electric power conversion system and a HVDC transmission system, e.g., without limitation, bi-directional power converters, mechanical isolation devices, and monitoring devices (neither shown in FIG. 1). Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, real-time and historical voltage and current values, and/or any other type data. Also, memory device 110 includes, without limitation, sufficient data, algorithms, and commands to facilitate monitoring and control of the components within a HVDC transmission system and an associated electric power conversion system.

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices. In some embodiments, presentation interface 120 presents an alarm associated with the HVDC transmission system and associated electric power conversion system being monitored, such as by using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor or another computing device 105, and to perform input and output operations with respect to such devices while performing as an input channel. Communication interface 135 may receive data from and/or transmit data to one or more remote devices. For example, a communication interface 135 of one computing device 105 may transmit an alarm to the communication interface 135 of another computing device 105.

Figure 2:
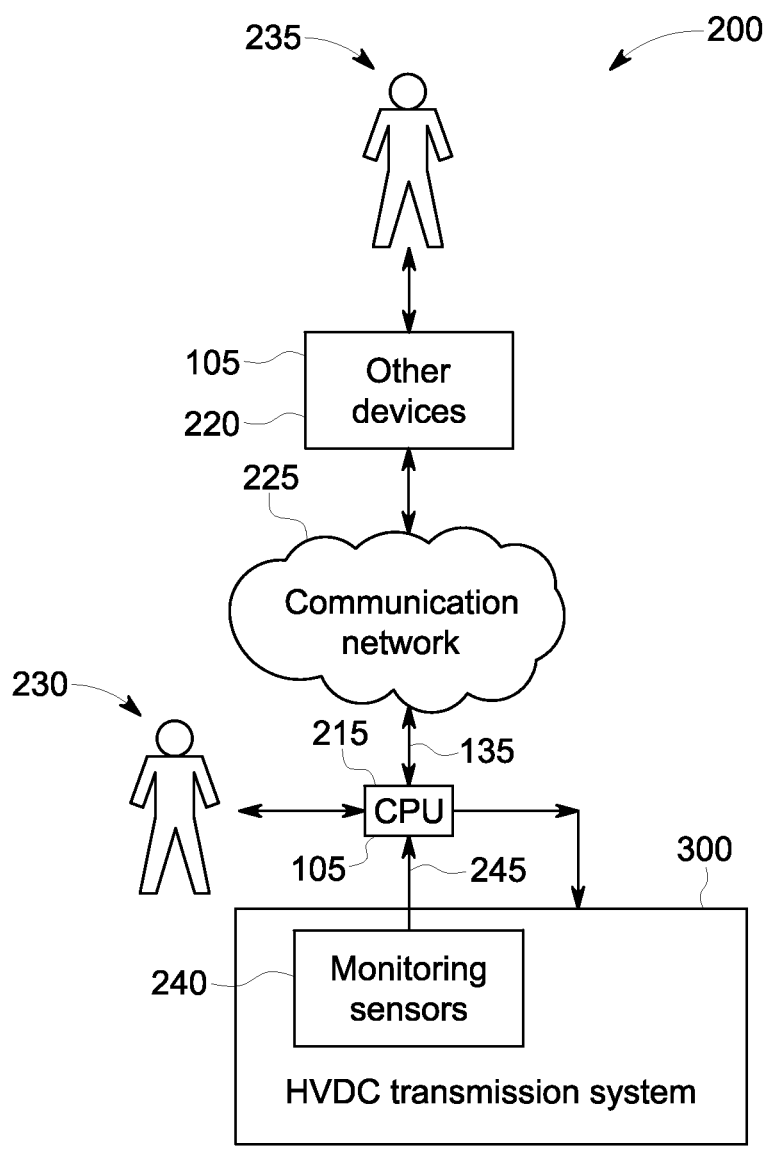
FIG. 2 is block diagram of a portion of an exemplary monitoring and control system that may include the computing device shown in FIG. 1.

FIG. 2 is block diagram of a portion of a monitoring and control system 200, that may be used to monitor and control at least a portion of an associated HVDC transmission system 300 and associated HVDC converter systems (not shown in FIG. 2). In the exemplary embodiment, monitoring and control system 200 is implemented within a control box (not shown) positioned proximate the converters (not shown in FIG. 2) that it controls. Alternatively, monitoring and control system 200 may be implemented in a broader large-scale system, e.g., and without limitation, a Supervisory Control and Data Acquisition (SCADA) system. As used herein, the term "SCADA system" refers to any control and monitoring system that may monitor and control HVDC transmission system 300 across multiple sites, remote sites, and large distances. In some embodiments, the SCADA system may be a portion of a larger electrical management system (EMS). In the exemplary embodiment, monitoring and control system 200 includes at least one central processing unit (CPU) 215 configured to execute monitoring algorithms and monitoring logic. CPU 215 may be coupled to other devices 220 via a communication network 225.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

CPU 215 interacts with a first operator 230, e.g., without limitation, via user input interface 130 and/or presentation interface 120. In one embodiment, CPU 215 presents information about electric power conversion system 300, such as alarms, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining electric power conversion system 300, including, without limitation, shift operations personnel, maintenance technicians, and facility supervisors.

In the exemplary embodiment, HVDC transmission system 300 includes one or more monitoring sensors 240 coupled to CPU 215 through at least one input channel 245. Monitoring sensors 240 collect operational measurements including, without limitation, AC and DC voltages and currents generated within and transmitted through HVDC transmission system 300. Monitoring sensors 240 repeatedly, e.g., periodically, continuously, and/or upon request, transmit operational measurement readings at the time of measurement. CPU 215 receives and processes the operational measurement readings. Such data is transmitted across network 225 and may be accessed by any device capable of accessing network 225 including, without limitation, desktop computers, laptop computers, and personal digital assistants (PDAs) (neither shown). In alternative embodiments, CPU 215 includes, without limitation, sufficient data, algorithms, and commands to facilitate control of the DC current transmission through HVDC transmission system 300.

Figure 3:
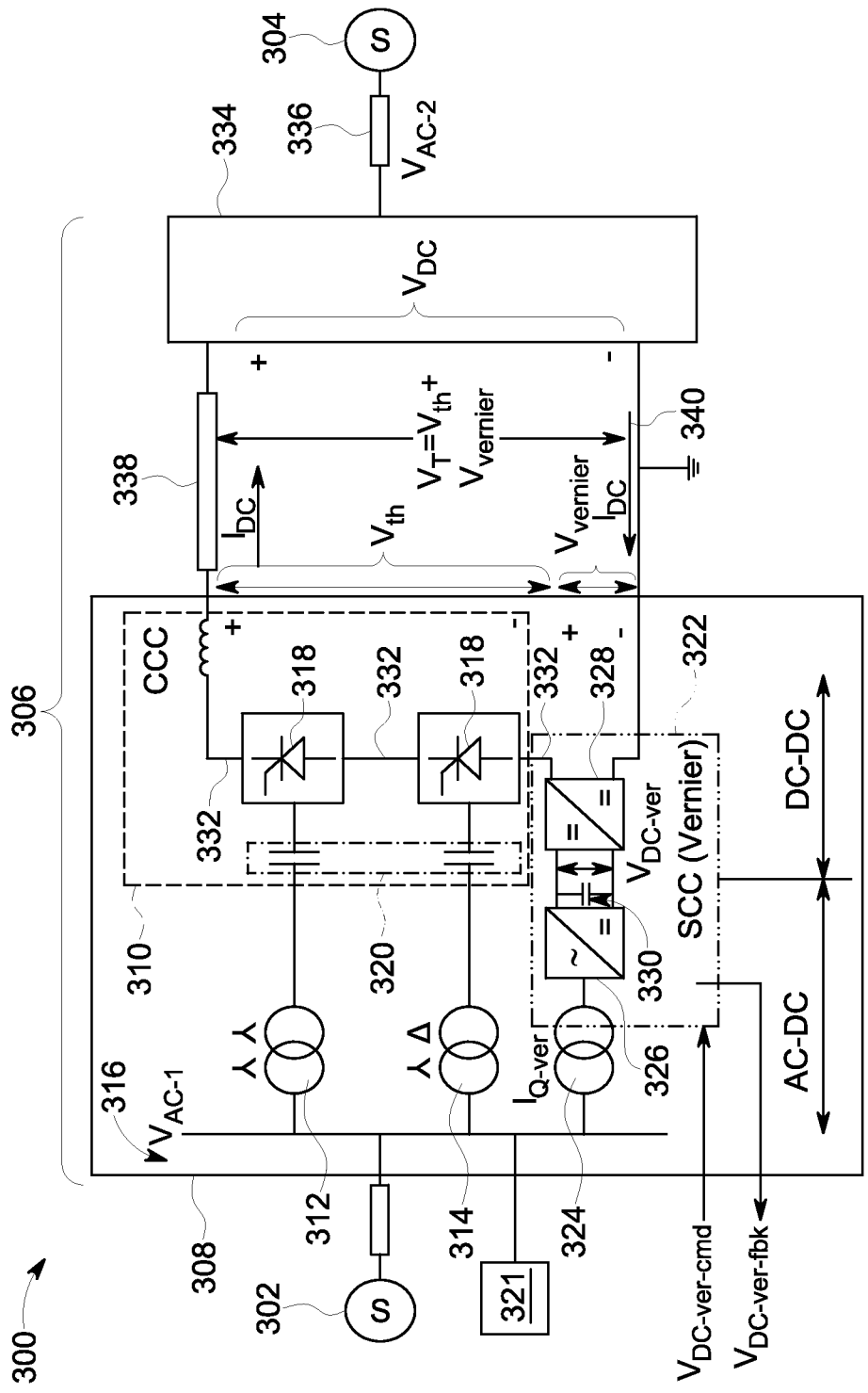
FIG. 3 is a schematic view of an exemplary high voltage direct current (HVDC) transmission system.

FIG. 3 is a schematic view of an exemplary high voltage direct current (HVDC) transmission system 300. HVDC transmission system 300 couples an alternating current (AC) electric power source 302 to an AC electric power transmission and distribution grid 304. Alternative embodiments include source 302 and grid 304 being interchangeable. HVDC transmission system 300 includes a separated power conversion configuration 306. Separated power conversion configuration 306 includes a first hybrid HVDC converter system 308 that includes a capacitor commutated converter (CCC), i.e., CCC 310. Alternatively, first hybrid HVDC converter system 308 includes at least one line commutated converter (LCC). CCC 310 is coupled to AC electric power source 302 through a plurality of transformers 312 and 314 and a plurality of AC buses 316. Buses 316 are energized to a voltage of $V_{AC\text{-}1}$. First HVDC converter system 308, i.e., CCC 310 includes a plurality of thyristors 318 coupled to transformers 312 and 314 through a plurality of capacitive devices 320. In the exemplary embodiment, capacitors 320 are series capacitors. Further, in some embodiments, CCC 310 includes additional power conversion devices, e.g., and without limitation, diode bridges. Moreover, in the exemplary embodiment, a physical AC filtering system 321 is coupled to AC buses 316. Furthermore, in some embodiments, AC filtering is performed through software-based controls.

First hybrid HVDC converter system 308 further includes a self-commutated converter (SCC), i.e., a vernier 322 coupled in parallel with CCC 310 to AC buses 316 through a transformer 324. Vernier 322 includes an AC-to-DC (AC/DC) converter stage 326 coupled to a DC-to-DC (DC/DC) converter stage 328 with a DC link 330 therebetween. Both AC/DC converter stage 326 and DC/DC converter stage 328 include a plurality of IGBTs (not shown). CCC 310 and vernier 322 are coupled in series through a plurality of DC buses 332. Also, in some alternative embodiments, DC link 330 is coupled to energy storage devices, including, without limitation, batteries and inertial storage devices, thereby facilitating, without limitation, voltage support for AC buses 316 and series capacitor (not shown) charging for CCC 310. In some embodiments, DC buses 332 include devices such as, and without limitation, hardware-type DC-side harmonic filters (not shown) for reducing DC-ripple effects after rectification. In other embodiments, software-type DC-side harmonic filters may be used.

Separated power conversion configuration 306 also includes a second HVDC converter system 334 coupled to AC electric power transmission and distribution grid 304 through a plurality of AC buses 336. Buses 336 are energized to a voltage of $V_{AC\text{-}2}$. Second HVDC converter system 334 is also coupled to first hybrid HVDC converter system 308 through a plurality of HVDC transmission buses 338 and 340. In the exemplary embodiment, HVDC transmission system 300 includes a uni-polar configuration and bus 338 is maintained at a positive voltage potential and bus 340 is maintained at a substantially neutral, or ground potential. Alternatively, HVDC transmission system 300 may have a bi-polar configuration. In the exemplary embodiment, first hybrid HVDC converter system 308 and second HVDC converter system 334 are substantially identical. Alternatively, second HVDC converter system 334 does not include a vernier 322. Also, alternatively, second HVDC converter system 334 includes a vernier that is different from vernier 322. Further, alternatively, second HVDC converter system 334 is a voltage source converter (VSC).

In operation, first hybrid HVDC converter system 308 receives three-phase, sinusoidal, alternating current (AC) power from AC electric power source 302 and rectifies the three-phase, sinusoidal, AC power to DC power with a current $I_{DC}$ at a predetermined voltage $V_T$ that is transmitted across buses 338 and 340. Second HVDC converter system 334 receives $I_{DC}$ at a predetermined voltage $V_{DC}$ ($V_T$ minus the voltage drop across bus 338) and converts the DC power to three-phase, sinusoidal, AC power with pre-determined voltages, currents, and frequencies. The combination of vernier 322 and CCC 310 regulates the DC voltage ($V_{DC}$) on the DC-side of the converters within established parameters. The sum of $V_{vernier}$ and $V_{th}$ is $V_T$. The physical size and ratings of vernier 322 is much smaller than those of CCC 310. As such, CCC 310 generates a thyristor voltage ($V_{th}$) that makes up the majority of $V_T$ and thereby operates at a firing angle at which reactive power consumption is low, i.e., in a manner similar to a 12-pulse diode bridge rectifier, and vernier 322 generates residual voltage to control the DC bus current, voltage or power, i.e., $V_{vernier}$ and hence not requiring the firing angle of the thyristors 318 in CCC 310 to change in normal operation or in the event of moderate increase/decrease in AC bus voltage. Therefore by virtue of operation of CCC 310 in a manner similar to a 12-pulse diode rectifier and SCC 322 generating residual voltage in order to control HVDC voltage/power and/or compensate for increases/decreases in AC bus voltage, the reactive power requirement of hybrid HVDC converter 308 is substantially low. Additionally, due to the use of CCC 310 as compared to a conventional LCC, a substantial reduction in the rating of SCC 322 is achieved.

In addition, vernier 322 is configured to pull DC power from DC buses 332 through DC/DC converter stage 328 to regulate voltage $V_{DC\text{-}ver}$ on DC link 330 such that AC/DC converter stage 326 generates a reactive power (Q) control current $I_{Q\text{-}ver}$ for injecting reactive power onto AC buses 316 to facilitate maintaining and/or regulating AC bus voltage $V_{AC\text{-}1}$.

AC/DC converter stage 326 operates in the four quadrants of the real-reactive power plane. DC/DC converter stage 328 also operates in at least two of the four quadrants of the DC voltage-DC current plane. Such DC quadrature is discussed further below.

For the exemplary embodiment of HVDC transmission system 300 with two converter systems, i.e., one converter system on each end of HVDC transmission system 300, $V_{DC}$ for HVDC transmission system 300 is controlled by only one of first and second HVDC converter systems 308 and 334, respectively, to regulate transmission of $I_{DC}$ through HVDC transmission system 300.

Figure 4:
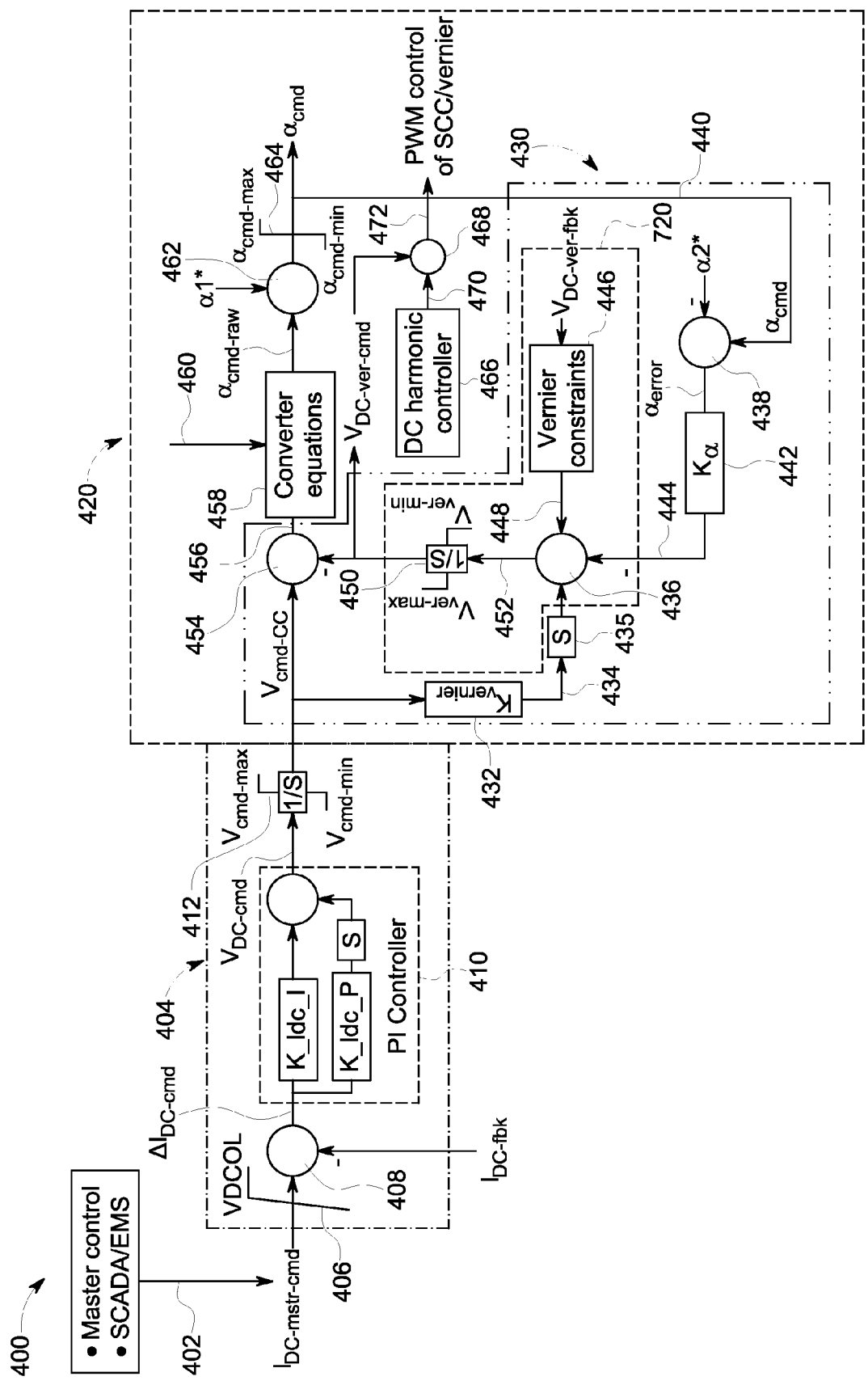
FIG. 4 is a schematic view of an exemplary control scheme for a first hybrid HVDC converter system that may be used with the HVDC transmission system shown in FIG. 3.

FIG. 4 is a schematic view of an exemplary control scheme 400 for first hybrid HVDC converter system 308 (shown in FIG. 3) that may be used with HVDC transmission system 300 (shown in FIG. 3) and implemented in monitoring and control system 200 (shown in FIG. 2). Control scheme 400 is shown and described with exemplary control devices. However, any alternative control devices and methods that enable operation of control scheme 400 as described herein are used.

In the exemplary embodiment, first hybrid HVDC converter system 308 is operating as a rectifier. Control scheme 400 receives DC line current margin coordination signals 402 from a master control system, i.e., monitoring and control system 200 and/or a SCADA/EMS. In the exemplary embodiment, signals 402 are DC current command signals, i.e., $I_{DC\text{-}mstr\text{-}cmd}$, such current command signals also transmitted to the control scheme (not shown in FIG. 4) for second HVDC converter system 334 (shown in FIG. 3). As used herein, the term "current margin control" and similar terms, e.g., and without limitation, "current margin coordination" refers to DC current command signals 402 ($I_{DC\text{-}mstr\text{-}cmd}$) being transmitted to two converter systems from monitoring and control system 200 and/or a SCADA/EMS. While such $I_{DC\text{-}mstr\text{-}cmd}$ signals are substantially similar, in current margin control an offset signal (not shown in FIG. 4 and discussed further below) is used with one of the signals such that one net command is slightly greater than the other, thereby reducing a potential for both of the converters to attempt to assume dominant control over the other simultaneously.

Control scheme 400 includes a current control (CC) loop module 404 that acts as a DC current regulator. Module 404 includes a voltage dependent current order limit (VDCOL) module 406. DC current command signals $I_{DC\text{-}mstr\text{-}cmd}$ are transmitted to VDCOL module 406 that prevents current commands from proceeding that would result in voltages in excess of a predetermined high voltage setpoint. CC loop module 404 also includes a summing module 408. The $I_{DC\text{-}cmd}$ signals that are allowed to proceed are transmitted to summing module 408. Summing module 408 receives feedback signals $I_{DC\text{-}fbk}$ representative of current $I_{DC}$ transmitting in real-time through HVDC transmission buses 338 and 340 (both shown in FIG. 3). $I_{DC\text{-}fbk}$ is subtracted from $I_{DC\text{-}mstr\text{-}cmd}$ to generate a current differential signal $\Delta I_{DC\text{-}cmd}$.

CC loop module 404 further includes a proportional-integral (PI) controller module 410 that receives current differential signals command $\Delta I_{DC\text{-}cmd}$ and generates voltage command signals $V_{DC\text{-}cmd}$. CC loop module 404 also includes an integrator module 412 that receives voltage command signals $V_{DC\text{-}cmd}$ and integrates the signal between the limits of a predetermined minimum voltage command value ($V_{cmd\text{-}min}$) and a predetermined maximum voltage command value ($V_{cmd\text{-}max}$). The resultant integrated signals are CC loop voltage command signals, i.e., $V_{cmd\text{-}CC}$. The limits of $V_{cmd\text{-}min}$ and $V_{cmd\text{-}max}$ are variable and are subject to change as a function of real-time system conditions as determined by, for example, and without limitation, $I_{DC\text{-}fbk}$ (as discussed above) and $V_{DC\text{-}fbk}$ representative of voltage $V_{DC}$ induced in real-time across HVDC transmission buses 338 and 340 (both shown in FIG. 3).

Control scheme 400 also includes a firing angle/gating module 420 configured to control first hybrid HVDC converter system 308 as a rectifier. Module 420 receives $V_{cmd\text{-}CC}$ from CC loop module 404. Firing angle/gating module 420 includes an IGBT (Vernier) and Thyristor (CCC) converter share control module 430. Share control module 430 includes a weighting factor module 432 with a predetermined gain of $K_{vernier}$. $V_{cmd\text{-}CC}$ from CC loop module 404 is multiplied by gain $K_{vernier}$ to generate a signal 434 that represents a controllable proportion of $V_{cmd\text{-}CC}$ that is within a broad set of parameters defined for vernier 322 (shown in FIG. 3).

The sum of $V_{vernier}$ and $V_{th}$ is $V_T$, and $V_T$ is regulated to provide for predetermined values of $V_{DC}$ after accounting for the voltage drop across HVDC transmission bus 338. The majority of small voltage changes in $V_T$, which typically result in large changes in $I_{DC}$, are facilitated through adjustments of $V_{vernier}$. However, in the event that voltage adjustments to $V_T$ cannot be achieved through regulation of vernier 322 and $V_{vernier}$ alone, $V_{th}$ will be adjusted through thyristors 318 to achieve the desired $V_T$. For example, if it is determined that a voltage transient condition on DC buses 332 exists, and it is also determined that vernier 322 is approaching a predetermined parameter, e.g., a voltage and/or current rating of vernier 322, a firing command reference value (α2, discussed further below) is regulated to increase a portion of control of the $V_T$ through regulating $V_{th}$ through CCC 310, thereby facilitating an increase of a margin to the predetermined parameters of vernier 322. As such, an operational bandwidth of vernier 322 to regulate $V_T$ through regulation of $V_{vernier}$ is increased and vernier 322 will continue to regulate $V_T$.

Share control module 430 also includes a differentiator module 435, that receives and differentiates signal 434 as a function of time to determine a rate of change of vernier controllable signal 434, followed by a summing module 436 that receives differentiated signal 434. Share control module 430 further includes a summing module 438 coupled to a feed-forward loop 440 for transmitting a (firing angle) commands $α_{cmd}$ (discussed further below). Summing module 438 also receives a firing angle command offset signal α2 that represents a firing command reference value based on desired power factor associated with the AC-side of first hybrid HVDC converter system 308 (shown in FIG. 3). To facilitate rectifier operation, the value of α2 may be selected to the lowest value for which firing of thyristors 318 remains satisfactory. For example, in CCC 310, the firing angle can take a negative value as low as −15 degrees to function in a manner similar to a 12-pulse diode rectifier. The α2 signal is subtracted from the $α_{cmd}$ signal to generate a firing angle error signal $α_{error}$ that is transmitted to a gain module 442, where the gain $K_α$ is selected to facilitate driving the firing angle error signal $α_{error}$ toward zero and to facilitate determining a bandwidth of share control module 430 which may be slower than the CC loop module 304 (and any voltage control loop module, discussed further below). For example, a high value for gain $K_α$ may be selected to drive the firing angle error signal $α_{error}$ toward zero faster, while a low value for gain $K_α$ may be selected to drive the firing angle error signal $α_{error}$ toward zero slower, with the slower option being most preferable. The output signal 444 of gain module 442 facilitates a decrease of the firing angle of thyristors 318 (shown in FIG. 3), thereby facilitating a decrease in the amount of reactive power consumed by CCC 310. Output signal 444 is transmitted to summing module 436.

Share control module 430 also includes a vernier constraints module 446 that receives a feedback signal $V_{DC\text{-}ver\text{-}fbk}$ representative of the real-time voltage of DC link 330. In the event that $V_T$ (shown in FIG. 3) exceeds established parameters, predetermined vernier constraint signals 448 are transmitted to summing module 436 to constrain the commands (discussed further below) transmitted to the IGBTs in vernier 322. Such constraints include bands of ranges for DC link voltage $V_{DC\text{-}ver}$, where each band will generate a different vernier constraint signal 448. Signals 448 are discussed further below in connection with FIG. 12.

Share control module 430 further includes an integrator module 450 that receives output signals 452 from summing module 436 and integrates the signals between the limits of a predetermined minimum vernier voltage command value ($V_{ver\text{-}min}$) and a predetermined maximum vernier voltage command value ($V_{ver\text{-}max}$). $V_{ver\text{-}min}$ and $V_{ver\text{-}max}$ are functions of the voltage ratings of DC/DC converter stage 328 of vernier 322 (both shown in FIG. 3). The resultant integrated signals are vernier voltage command signals, i.e., $V_{DC\text{-}ver\text{-}cmd}$. The combined effect of the subtraction functions associated with summing modules 436 and 438 on the α2 signal is to introduce the value of α2 selected as the lowest value for which firing of thyristors 318 remains satisfactory to facilitate rectifier operation to integrator module 450 within signal 452. Share control module 430 also includes a summing module 454 that receives $V_{cmd\text{-}CC}$ from CC loop module 404 and subtracts $V_{DC\text{-}ver\text{-}cmd}$, thereby generating a raw CCC thyristor voltage command signal 456.

Firing angle/gating module 420 also includes a converter equations module 458 that receives raw CCC voltage command signals 456 and real-time feed-forward measurement signals 460, e.g., and without limitation, real-time AC voltages and DC voltages associated with HVDC converter system 300 such that predetermined measurements associated with system disturbances are rejected to reduce a potential for control scheme 400 over-reacting to such disturbances and exacerbating system instability. Converter equations module 458 is programmed with sufficient algorithms and instructional logic to generate raw thyristors firing command signals $\alpha_{cmd\text{-}raw}$.

Firing angle/gating module 420 further includes a summing module 462 that receives raw thyristor firing command signals $\alpha_{cmd\text{-}raw}$ and a predetermined thyristors firing command offset signal al that may be used to adjust the rectification process. Summing module 462 generates thyristor firing command signals $\alpha_{cmd}$.

Firing angle/gating module 420 also includes a thyristor firing command limit module 464 that receives thyristor firing command signals $\alpha_{cmd}$. Limit module 464 is programmed with predetermined limits of a predetermined minimum thyristor firing command signal ($\alpha_{cmd\text{-}min}$) and a predetermined maximum thyristor firing command signal ($\alpha_{cmd\text{-}max}$). Thyristor firing command limit module 464 prevents thyristor firing commands $\alpha_{cmd}$ from proceeding that would result in voltages in excess of a predetermined high voltage setpoint. If thyristor firing command signals $\alpha_{cmd}$ are between $\alpha_{cmd\text{-}max}$ and $\alpha_{cmd\text{-}min}$, thyristor firing commands $\alpha_{cmd}$ are transmitted to CCC 310.

Firing angle/gating module 420 further includes a DC harmonic regulator 466 coupled to a summing module 468 configured to receive $V_{DC\text{-}ver\text{-}cmd}$ signals. DC harmonic regulator 466 transmits signals 470 configured to regulate $V_{vernier}$ to regulate AC signals purposely injected onto DC buses 332 (shown in FIG. 3). Summing module 468 transmits pulse width modulation (PWM) signals 472 to regulate vernier 322.

For example, in the event of a measured, real-time unbalance between at least one of a measured real-time voltage and/or current on AC buses 316 and a measured, real-time voltage on DC buses 332, DC harmonic regular 446 decreases the impact of the unbalance. Specifically, DC harmonic regulator 466 transmits signals 470 that facilitate inducing an AC voltage on DC buses 332 through regulation of vernier 322, where a frequency of the AC voltage induced on DC buses 332 is substantially similar to the second harmonic frequency of a fundamental frequency of the AC voltage measured on AC buses 316. As such, the AC unbalances are compensated for and the impact on the voltage on DC buses 332 due to the interaction between the AC side and the DC side is reduced.

Also, for example, in the event that AC buses 316 and DC buses 332 have a close physical proximity to each other that facilitates inductive coupling therebetween, DC harmonic regular 466 decreases the impact of the unwanted induced AC signals on DC buses 332. Specifically, DC harmonic regulator 466 transmits signals 470 that facilitate inducing an AC voltage on DC buses 332 through regulation of vernier 322. A determination is made if the fundamental frequency of AC buses 316 is similar to the induced frequency on DC buses 332. The amplitude and phase angle of the induced AC voltage on DC buses and/or the amplitude and phase angle of the voltage on AC buses 316 are measured. Vernier 322 is regulated to modulate the DC voltage by injecting an AC voltage on DC buses 332 with a magnitude and phase angle that reduces the AC voltage induced on DC bus 332 by AC buses 316.

Control scheme 400 for first hybrid HVDC converter system 308 facilitates operation of system 308 as a rectifier. Current control loop module 404 generates voltage command signals $V_{cmd\text{-}CC}$ that are distributed between the IGBTs of vernier 322 and thyristors 318 of CCC 310. As such, appropriate values of $V_{vernier}$ and $V_{th}$, respectively, are generated to provide an appropriate $V_T$ that facilitates providing an appropriate $V_{DC}$. The majority of small voltage changes in $V_T$, which typically result in large changes in $I_{DC}$, are facilitated through adjustments of $V_{vernier}$. However, in the event that voltage adjustments to $V_T$ cannot be achieved through regulation of vernier 322 and $V_{vernier}$ alone, $V_{th}$ will be adjusted through thyristors 318 to achieve the desired $V_T$.

Figure 5:
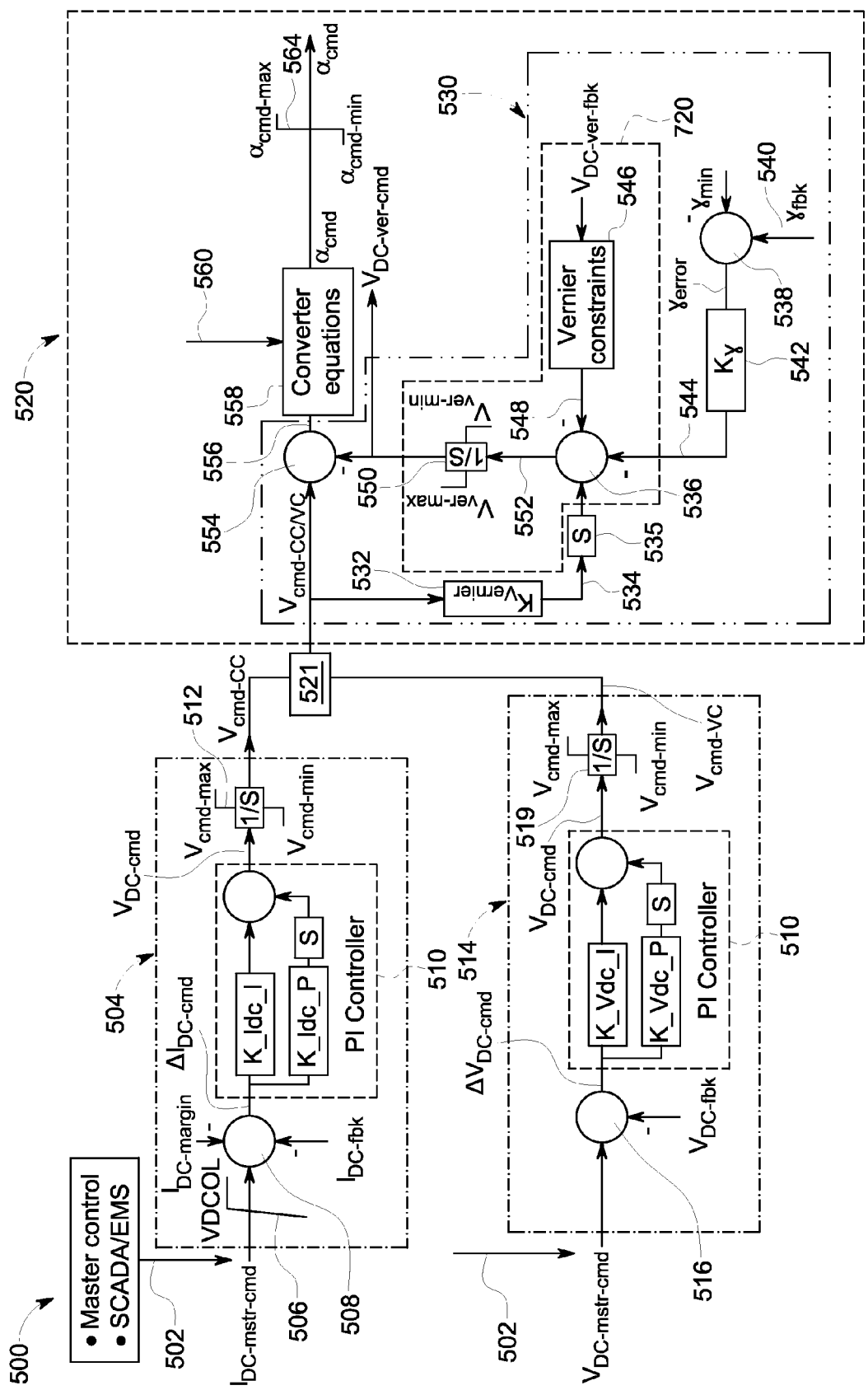
FIG. 5 is a schematic view of an exemplary control scheme for a second hybrid HVDC converter system that may be used with the HVDC transmission system shown in FIG. 3.

FIG. 5 is a schematic view of an exemplary control scheme 500 for second HVDC converter system 334 (shown in FIG. 3) that may be used with HVDC transmission system 300 (shown in FIG. 3) and implemented in monitoring and control system 200 (shown in FIG. 2). Control scheme 500 is shown and described with exemplary control devices. However, any alternative control devices and methods that enable operation of control scheme 500 as described herein are used.

In the exemplary embodiment, second HVDC converter system 334 is operating as an inverter. Control scheme 500 receives DC line current margin coordination signals 502 from a master control system, i.e., monitoring and control system 200 and/or a SCADA/EMS. In the exemplary embodiment, signals 502 are DC current command signals, i.e., $I_{DC\text{-}mstr\text{-}cmd}$, such current command signals also transmitted to control scheme 400 (shown in FIG. 4) for first converter system 334 (shown in FIG. 3). As used herein, the term "current margin control" and similar terms, e.g., and without limitation, "current margin coordination" refers to DC current command signals 502 ($I_{DC\text{-}mstr\text{-}cmd}$) and 402 (shown in FIG. 4) being transmitted to two converter systems from monitoring and control system 200 and/or a SCADA/EMS. While such $I_{DC\text{-}mstr\text{-}cmd}$ signals 402 and 502 are substantially similar, in current margin control an offset signal (discussed further below) is used with one of the signals such that one net command is slightly greater than the other, thereby reducing a potential for both of the converters to attempt to assume dominant control over the other simultaneously.

Control scheme 500 includes a current control (CC) loop module 504 that acts as a DC current regulator. Module 504 includes a voltage dependent current order limit (VDCOL) module 506. DC current command signals $I_{DC\text{-}mstr\text{-}cmd}$ are transmitted to VDCOL module 506 that prevents current commands from proceeding that would result in voltages in excess of a predetermined high voltage setpoint. CC loop module 504 also includes a summing module 508. The $I_{DC\text{-}mstr\text{-}cmd}$ signals that are allowed to proceed are transmitted to summing module 508. Summing module 508 receives feedback signals $I_{DC\text{-}fbk}$ representative of current $I_{DC}$ transmitting in real-time through HVDC transmission buses 338 and 340 (both shown in FIG. 3). Summing module 508 also receives $I_{DC\text{-}margin}$ signals, where the $I_{DC\text{-}margin}$ signals are representative of a predetermined margin, i.e., a current offset value to reduce a potential for control scheme 500 to conflict with control scheme 400. $I_{DC\text{-}fbk}$ and $I_{DC\text{-}margin}$ are subtracted from $I_{DG\text{-}mstr\text{-}cmd}$ to generate a current differential signal $\Delta I_{DC\text{-}cmd}$. Therefore, summing module 508, $I_{DC\text{-}margin}$ signals, and signals 402 and 502 from monitoring and control system 200 define a DC line current margin coordination scheme.

CC loop module 504 further includes a proportional-integral (PI) controller module 510 that receives current differential signals command $\Delta I_{DC\text{-}cmd}$ and generates voltage command signals $V_{DC\text{-}cmd}$. CC loop module 504 also includes an integrator module 512 that receives voltage command signals $V_{DC\text{-}cmd}$ and integrates the signal between the limits of a predetermined minimum voltage command value ($V_{cmd\text{-}min}$) and a predetermined maximum voltage command value ($V_{cmd\text{-}max}$). The resultant integrated signals are CC loop voltage command signals, i.e., $V_{cmd\text{-}CC}$. The limits of $V_{cmd\text{-}min}$ and $V_{cmd\text{-}max}$ are variable and are subject to change as a function of real-time system conditions as determined by, for example, and without limitation, $V_{DC\text{-}fbk}$ and $I_{DC\text{-}fbk}$.

CC loop module 504 also includes an integrator module 512 that receives voltage command signals $V_{DC\text{-}cmd}$ and integrates the signal between the limits of a predetermined minimum voltage command value ($V_{cmd\text{-}min}$) and a predetermined maximum voltage command value ($V_{cmd\text{-}max}$). The resultant integrated signals are CC loop voltage command signals, i.e., $V_{cmd\text{-}CC}$. The limits of $V_{cmd\text{-}min}$ and $V_{cmd\text{-}max}$ are variable and are subject to change as a function of real-time system conditions as determined by, for example, and without limitation, $V_{DC\text{-}fbk}$ and $I_{DC\text{-}fbk}$.

In addition to control scheme 500 receiving DC line current margin coordination signals 502 from a master control system, i.e., monitoring and control system 200 and/or a SCADA/EMS, control scheme 500 also receives DC voltage command signals, i.e., $V_{DC\text{-}mstr\text{-}cmd}$, such voltage command signals also transmitted to control scheme 400 (shown in FIG. 4) for first converter system 334 (shown in FIG. 3), if control scheme 400 includes a voltage control loop (discussed further below).

Control scheme 500 includes a voltage control (VC) loop module 514 that acts as a DC voltage regulator. Module 514 includes a summing module 516. The $V_{DC\text{-}mstr\text{-}cmd}$ signals are transmitted to summing module 516. Summing module 516 receives feedback signals $V_{DC\text{-}fbk}$ representative of voltage $V_{DC}$ induced in real-time across HVDC transmission buses 338 and 340 (both shown in FIG. 3). $V_{DC\text{-}fbk}$ is subtracted from $V_{DC\text{-}mstr\text{-}cmd}$ to generate a current differential signal $\Delta V_{DC\text{-}cmd}$.

VC loop module 514 further includes a proportional-integral (PI) controller module 518 that receives voltage differential signals command $\Delta V_{DC\text{-}cmd}$ and generates voltage command signals $V_{DC\text{-}cmd}$. VC loop module 514 also includes an integrator module 519 that receives voltage command signals $V_{DC\text{-}cmd}$ and integrates the signal between the limits of a predetermined minimum voltage command value ($V_{cmd\text{-}min}$) and a predetermined maximum voltage command value ($V_{cmd\text{-}max}$). The resultant integrated signals are VC loop voltage command signals, i.e., $V_{cmd\text{-}VC}$. The limits of $V_{cmd\text{-}min}$ and $V_{cmd\text{-}max}$ are variable and are subject to change as a function of real-time system conditions as determined by, for example, and without limitation, $V_{DC\text{-}fbk}$ and $I_{DC\text{-}fbk}$.

Control scheme 500 also includes a firing angle/gating module 520 configured to control second HVDC converter system 334 as an inverter. Firing angle/gating module 520 is not interchangeable with control scheme 400 for first hybrid HVDC converter system 308 when operated as a rectifier. However, it should be noted that control schemes 400 and/or 500 can be implemented together for a converter station and depending on the operation mode various forms of 400 or 500 may be used. Module 520 receives one of $V_{cmd\text{-}VC}$ and $V_{cmd\text{-}CC}$ from VC loop module 514 as determined by a selection module 521 that allows one of the two signals to pass through to firing angle/gating module 520 and blocks the other of the two signals. Typically, $V_{cmd\text{-}VC}$ is greater than $V_{cmd\text{-}CC}$. The selected voltage signal that is passed through module 521, depending on the selection criteria of module 521, is labeled as $V_{cmd\text{-}CC/VC}$.

Firing angle/gating module 520 includes an IGBT (Vernier) and Thyristor (CCC) converter share control module 530. Share control module 530 includes a weighting factor module 532 with a predetermined gain of $K_{vernier}$. $V_{cmd\text{-}CC/VC}$ from selection module 521 is multiplied by gain $K_{vernier}$ to generate a signal 534 that represents a controllable proportion of $V_{cmd\text{-}CC/VC}$ that is within a broad set of parameters defined for vernier 322 (shown in FIG. 3).

As described above, in the exemplary embodiment, first hybrid HVDC converter system 308 and second HVDC converter system 334 are substantially identical, including verniers 322. Therefore, in a manner similar to that of share control module 430 (shown in FIG. 4), the combination of vernier 322 and CCC 310 regulates DC voltage $V_{DC}$ on the DC-side of converters 308 and 334 within established parameters. The physical size and ratings of vernier 322 is much smaller than those of CCC 310. As such, CCC 310 generates thyristor voltage $V_{th}$ that makes up the majority of total DC voltage induced $V_T$ and vernier 322 generates a much smaller voltage. Therefore, CCC 310 acts as a commutated converter that exercises broad control of $V_T$ through regulating $V_{th}$ and vernier 322 exercises narrow, or vernier control of $V_T$ through regulating $V_{vernier}$. $V_{vernier}$ is established as a function of predetermined gain of $K_{vernier}$ as configured in weighting factor module 532.

The sum of $V_{vernier}$ and $V_{th}$ is $V_T$, and $V_T$ is regulated to provide for predetermined values of $V_{DC}$ after accounting for the voltage drop across HVDC transmission bus 338. The majority of small voltage changes in $V_T$, which typically result in large changes in $I_{DC}$, are facilitated through adjustments of $V_{vernier}$. However, in the event that voltage adjustments to $V_T$ cannot be achieved through regulation of vernier 322 and $V_{vernier}$ alone, $V_{th}$ will be adjusted through thyristors 318 to achieve the desired $V_T$. In the exemplary embodiment, first hybrid HVDC converter system 308 in inverter mode is typically the dominant of the two converter systems with respect to control of $V_{DC}$.

Share control module 530 also includes a differentiator module 535, that receives and differentiates signal 534 as a function of time to determine a rate of change of vernier controllable signal 534, followed by a summing module 536 that receives differentiated signal 534. Share control module 530 further includes a summing module 538 coupled to an extinction angle ($\gamma$) feedback loop 540 for transmitting real-time $\gamma_{fbk}$ signals for at least twelve thyristors 318 (discussed further below). Summing module 538 also receives an extinction angle ($\gamma$) "kicker" signal ($\gamma_{min}$). As such, summing module 538 may be referred to as an extinction-angle-kicker-for-fault module. As $\gamma$ increases, the probability of thyristor commutation failure decreases. Therefore, once $\gamma$ starts getting too small, a valve firing control strategy is to increase $\gamma$ by shifting the firing angle ($\alpha$) downward.

As such, signal $\gamma_{min}$ represents a value based on a desired margin to commutation failure associated with facilitating inverter operation of second HVDC converter system 334. To facilitate such inverter operation, the value of $\gamma_{min}$ may be selected to the lowest value for which firing of valves, i.e., thyristors 318 and the IGBTs in vernier 322, remains satisfactory. The $\gamma_{min}$ signal is subtracted from the $\gamma_{fbk}$ signal to generate an extinction angle error signal $\gamma_{error}$ that is transmitted to a gain module 542, where the gain $K_\gamma$ is predetermined to facilitate driving the firing angle error signal $\alpha_{error}$ toward zero and to facilitate determining a bandwidth of share control module 430 which may be slower than the CC loop module 304 (and any voltage control loop module, discussed further below). For example, a high value for gain $K_\gamma$ may be selected to drive the extinction angle error signal $\gamma_{error}$ toward zero faster, while a low value for gain $K_\gamma$ may be selected to drive the extinction angle error signal $\gamma_{error}$ toward zero slower, with the slower option being most preferable. The output signal 544 of gain module 542 is transmitted to summing module 536.

Share control module 530 also includes a vernier constraints module 546 that receives a feedback signal $V_{DC\text{-}ver\text{-}fbk}$ representative of the real-time voltage of DC link 330. In the event that $V_T$ (shown in FIG. 3) exceeds established parameters, predetermined vernier constraint signals 548 are transmitted to summing module 536 to constrain the commands (discussed further below) transmitted to the IGBTs in vernier 322. Such constraints include bands of ranges for DC link voltage $V_{DC\text{-}ver}$, where each band will generate a different vernier constraint signal 548.

Share control module 530 further includes an integrator module 550 that receives output signals 552 from summing module 536 and integrates the signals between the limits of a predetermined minimum vernier voltage command value ($V_{ver\text{-}min}$) and a predetermined maximum vernier voltage command value ($V_{ver\text{-}max}$). $V_{ver\text{-}min}$ and $V_{ver\text{-}max}$ are functions of the voltage ratings of DC/DC converter stage 328 of vernier 322 (both shown in FIG. 3). The resultant integrated signals are vernier voltage command signals, i.e., $V_{DC\text{-}ver\text{-}cmd}$. The combined effect of the subtraction functions associated with summing modules 536 and 538 on the $\gamma_{min}$ signal is to introduce the value of $\gamma_{min}$ selected as the lowest value for which firing of thyristors 318 remains satisfactory to facilitate inverter operation to integrator module 550 within signal 552. Share control module 530 also includes a summing module 554 that receives $V_{cmd\text{-}CC/VC}$ from selection module 521 and subtracts $V_{DC\text{-}ver\text{-}cmd}$, thereby generating a raw CCC thyristor voltage command signal 556.

Firing angle/gating module 520 also includes a converter equations module 558 that receives raw CCC voltage command signals 556 and real-time feed-forward measurement signals 560, e.g., and without limitation, real-time AC voltages and DC voltages associated with HVDC converter system 300 such that predetermined measurements associated with system disturbances are rejected to reduce a potential for control scheme 500 over-reacting to such disturbances and exacerbating system instability. Converter equations module 558 is programmed with sufficient algorithms and instructional logic to generate raw thyristors firing command signals $\alpha_{cmd}$.

Firing angle/gating module 520 further includes a thyristor firing command limit module 564 that receives thyristor firing command signals $\alpha_{cmd}$. Limit module 564 is programmed with predetermined limits of a predetermined minimum thyristor firing command signal ($\alpha_{cmd\text{-}min}$) and a predetermined maximum thyristor firing command signal ($\alpha_{cmd\text{-}max}$). Such $\alpha_{cmd\text{-}max}$ is a function of, without limitation, a predetermined minimum value for extinction angle $\gamma$ (that may, or may not, be equivalent to the $\gamma_{min}$ described above), $V_{AC}$, and $I_{DC}$. For example, and without limitation, if extinction angle $\gamma$ approaches a predetermined minimum value, $\alpha_{cmd\text{-}max}$ is a decreased to facilitate increasing the margin to commutation failure. Thyristor firing command limit module 564 prevents thyristor firing commands $\alpha_{cmd}$ from proceeding that would result in voltages in excess of a predetermined high voltage setpoint. If thyristor firing command signals $\alpha_{cmd}$ are between $\alpha_{cmd\text{-}max}$ and $\alpha_{cmd\text{-}min}$ thyristor firing commands $\alpha_{cmd}$ are transmitted to CCC 310.

Control scheme 500 for second HVDC converter system 334 facilitates operation of system 334 as an inverter. Current control loop module 504 and voltage control loop module 514 generate voltage command signals $V_{cmd\text{-}CC/VC}$ that are distributed between the IGBTs of vernier 322 and thyristors 318 of CCC 310. As such, appropriate values of $V_{vernier}$ and $V_{th}$, respectively, are generated to provide an appropriate $V_T$ that facilitates providing an appropriate $V_{DC}$. The majority of small voltage changes in $V_T$, which typically result in large changes in $I_{DC}$, are facilitated through adjustments of $V_{vernier}$. However, in the event that voltage adjustments to $V_T$ cannot be achieved through regulation of vernier 322 and $V_{vernier}$ alone, $V_{th}$ will be adjusted through thyristors 318 to achieve the desired $V_T$. Integrators 512 and 550 facilitate reducing accelerated reactions to disturbances on HVDC transmission system 300, thereby further facilitating system stability. Control of extinction angle $\gamma$ is at partially achieved through control of firing angle $\alpha$.

In the exemplary embodiment, $V_{DC}$ is typically maintained substantially constant through operation of second hybrid HVDC converter system 334 (shown in FIG. 3). However, under certain circumstances where control scheme 400 has difficulty in maintaining $V_{DC}$ constant, first HVDC converter system 308 and control scheme 400 either assist second hybrid HVDC converter system 334 and control scheme 500 or take the lead in control of HVDC transmission system 300.

Figure 6:
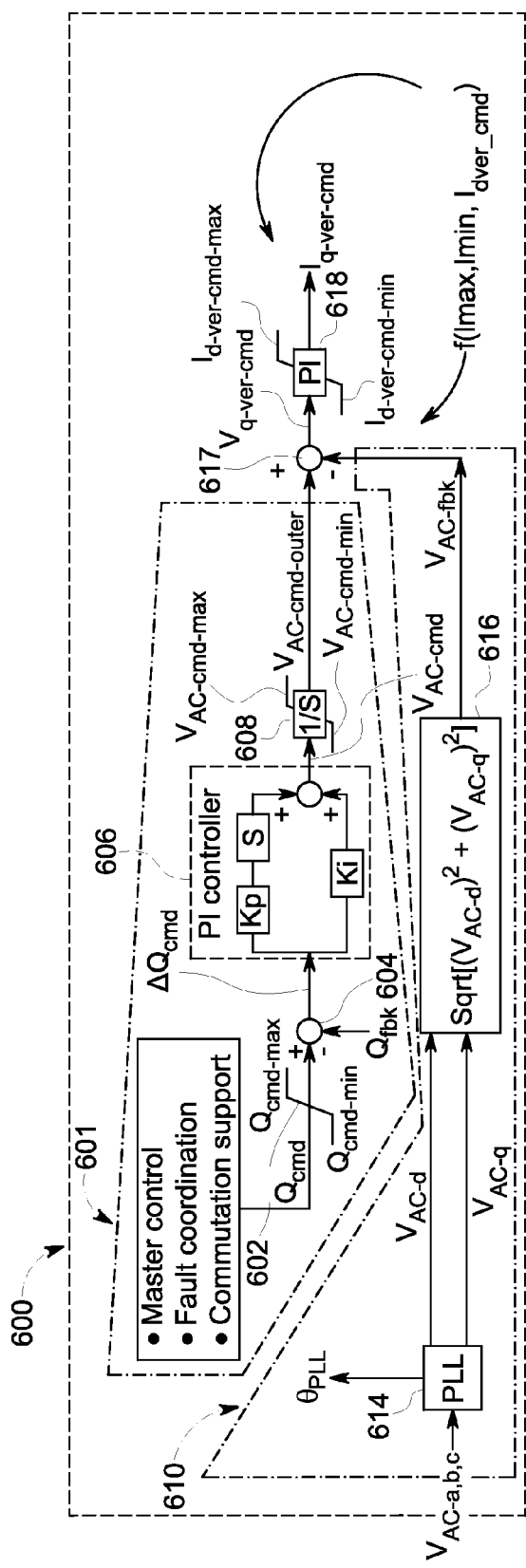
FIG. 6 is a schematic view of an exemplary control scheme for an AC/DC converter stage for a SCC that may be used with the HVDC transmission system shown in FIG. 3.

FIG. 6 is a schematic view of an exemplary outer volt-VAR control loop 600 for AC/DC converter stage 326 (shown in FIG. 3) for a self-commutated converter (SCC), i.e., vernier 322 (shown in FIG. 3) that may be used with HVDC transmission system 300 (shown in FIG. 3) and implemented in monitoring and control system 200 (shown in FIG. 2). Outer volt-VAR control loop 600 is shown and described with exemplary control devices. However, any alternative control devices and methods that enable operation of control loop 600 as described herein are used.

Outer volt-VAR control loop 600 operates, at least partially, as a vernier (SCC) AC control scheme. Outer volt-VAR control loop 600 facilitates volt-VAR control of first hybrid HVDC converter system 308 and second HVDC converter system 334 through control of the IGBTs in the associated AC/DC converter stage 326 of vernier 322. Such volt-VAR control facilitates regulating $V_{AC\text{-}1}$ due to fluctuations thereof as a function of shifting loads on HVDC transmission system 300, for example. Outer volt-VAR control loop 600 includes an outer VAR control loop 601.

Outer VAR control loop 601 receives vernier reactive power (Q) command and coordination signals, i.e., $Q_{cmd}$ from a master control system, i.e., monitoring and control system 200 and/or a SCADA/EMS. In the exemplary embodiment, $Q_{cmd}$ signals include reactive power fault coordination signals and commutation support signals. Control scheme 600 includes a reactive power command limit module 602 that receives $Q_{cmd}$ signals. Limit module 602 is programmed with predetermined limits of a predetermined minimum reactive power command signal ($Q_{cmd\text{-}min}$) and a predetermined maximum reactive power command signal ($Q_{cmd}$-max).

Outer VAR control loop 601 also includes a summing module 604. The $Q_{cmd}$ signals that are allowed to proceed are transmitted to summing module 604. Summing module 604 receives feedback signals $Q_{fbk}$ representative of reactive power load in real-time through AC buses 316 (shown in FIG. 3). $Q_{fbk}$ is subtracted from $Q_{cmd}$ to generate a reactive power (Q) differential signal $\Delta Q_{cmd}$.

Outer VAR control loop 601 further includes a proportional-integral (PI) controller module 606 that receives Q differential signals $\Delta Q_{cmd}$ and generates AC voltage command signals $V_{DC\text{-}cmd}$. Outer VAR control loop 601 also includes an integrator module 608 that receives voltage command signals $V_{DC\text{-}cmd}$ and integrates the signals between the limits of a predetermined minimum voltage command value ($V_{AC\text{-}cmd\text{-}min}$) and a predetermined maximum voltage command value ($V_{AC\text{-}cmd\text{-}max}$). The resultant integrated signals are outer VAR control loop voltage command signals, i.e., $V_{AC\text{-}cmd\text{-}outer}$.

Outer volt-VAR control loop 600 also includes an outer voltage control loop 610 that generates an AC voltage feedback signal $V_{DC\text{-}fbk}$ that is derived from the three AC terminal voltages, i.e., one for each of the three phases at AC buses 316. Such real-time AC terminal voltages are designated $V_{DC\text{-}a,b,c}$. AC terminal voltage signals $V_{DC\text{-}a,b,c}$ are transmitted to a phase lock loop (PLL) 614 that generates phase angle signals $\theta_{PLL}$ used elsewhere. PLL 614 also generates real power AC voltage $V_{AC\text{-}d}$ and reactive power AC voltage $V_{AC\text{-}q}$ as a function of the quadrature relationship of the phase angles of voltage and current and real and reactive power. Signals $V_{AC\text{-}d}$ and $V_{AC\text{-}q}$ are transmitted into an algorithm module 616 programmed with an equation that takes the square root of the sum of $(V_{AC\text{-}d})^2$ and $(V_{AC\text{-}q})^2$ to generate AC voltage feedback signal $V_{AC\text{-}fbk}$.

Control scheme 600 further includes a summing module 617 that receives outer voltage control loop voltage command signals $V_{AC\text{-}cmd\text{-}outer}$ and AC voltage feedback signal $V_{AC\text{-}fbk}$. Summing module 617 subtracts AC voltage feedback signal $V_{AC\text{-}fbk}$ from outer voltage control loop voltage command signals $V_{DC\text{-}cmd\text{-}outer}$ to generate a vernier reactive power control voltage signal $V_{q\text{-}ver\text{-}cmd}$.

Outer volt-VAR control loop 600 also includes a proportional-integral (PI) module 618 that receives vernier reactive power control voltage signal $V_{q\text{-}ver\text{-}cmd}$ and integrates the signals between the limits of a predetermined minimum current command value ($I_{d\text{-}ver\text{-}cmd\text{-}min}$) and a predetermined maximum current command value ($I_{d\text{-}ver\text{-}cmd\text{-}max}$). The resultant integrated signals are vernier reactive power (Q) current command signals, i.e., $I_{q\text{-}ver\text{-}cmd}$ for regulating Q control current $I_{q\text{-}ver}$ (shown in FIG. 3). The limits of $I_{d\text{-}ver\text{-}cmd\text{-}min}$ and $I_{d\text{-}ver\text{-}cmd\text{-}max}$ are variable and are subject to change as a function of real-time system conditions as discussed further below.

In general, outer voltage control loop 610 for voltage feedback and control is a faster control loop than the relatively slower outer VAR control loop 601 for VAR control such that outer volt-VAR control loop 600 reacts more quickly to real-time measured voltage changes on AC buses 316 to control the reactive power contribution from vernier 322 to buses 316 rather than the $V_{AC\text{-}cmd\text{-}outer}$ signals that originate from a remote control system, e.g., SCADA. Also, the output of outer volt-VAR control loop 600 is used by an inner current control loop (not shown in FIG. 6) as discussed further below.

Referring to FIGS. 3, 4, 5, and 6, after a transient, the firing angle α in conventional CCCs is typically returned back to the nominal value using tap changing transformers. In the exemplary embodiment, total DC voltage $V_T$ is regulated through the substantially simultaneous regulation of $V_{vernier}$ and $V_{th}$. Monitoring and control system 200 determines if there is an electric power transient associated with at least one of a measured real-time voltage value, current value, power value on AC buses 316, and at least one of a measured real-time voltage value, current value, and power value on DC buses 332. Also, $V_{vernier}$ is regulated prior to regulating $V_{th}$, thereby indirectly regulating AC voltages, currents, and powers and DC voltages, currents, and powers of hybrid HVDC converter system 308 through decreasing the control action required of CCC 310 to maintain the $V_T$, thereby facilitating substantially reducing tap changing operation of the at least one tap changing transformer. Therefore, reliance on tap changing is significantly reduced. Under certain conditions, tap changing transformers may be eliminated.

Further, for those configurations using a conventional CCC, and for a specific static and dynamic range of operation, improved control of $V_{DC}$ through control of vernier voltage $V_{vernier}$ with little to no changes in thyristor voltage $V_{th}$ facilitates using CCCs with lower capacitance ratings. As such, a smaller footprint may be realized by eliminating capacitor banks and the associated switchgear. Similarly, for a specific CCC, a broader range of static operation (for extended periods of time) and dynamic operation (for short-term, temporary transients) is facilitated.

Figure 7:
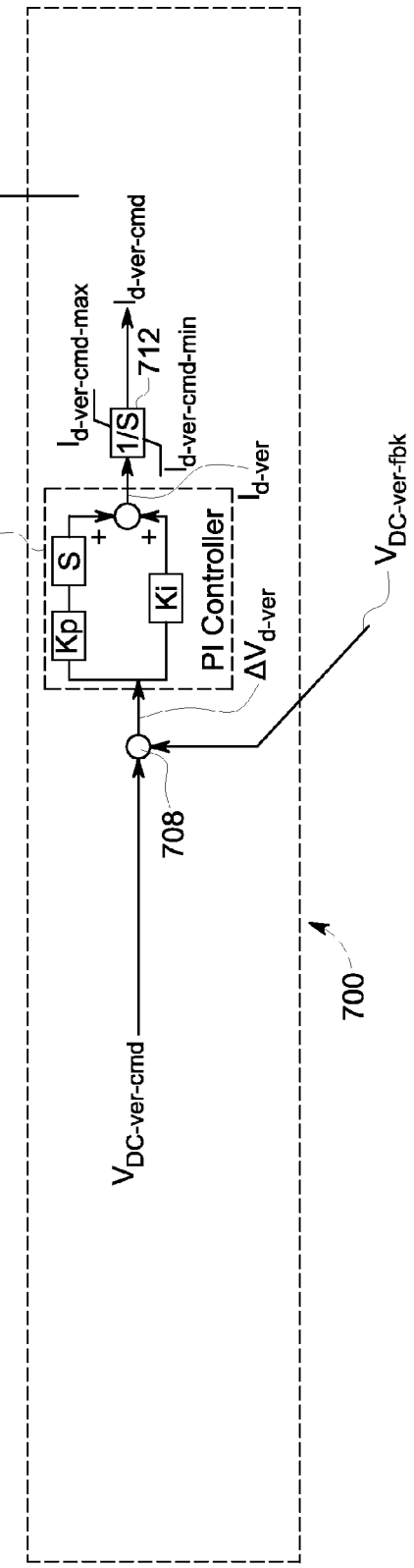
FIG. 7 is a schematic view of an exemplary control scheme for a DC/DC converter stage for a SCC that may be used with the HVDC transmission system shown in FIG. 3.

FIG. 7 is a schematic view of an exemplary outer DC link voltage control loop 700 for DC/DC converter stage 328 (shown in FIG. 3) for a self-commutated converter (SCC), i.e., vernier 322 (shown in FIG. 3) that may be used with HVDC transmission system 300 (shown in FIG. 3) and implemented in monitoring and control system 200 (shown in FIG. 2). Outer DC link voltage control loop 700 is shown and described with exemplary control devices. However, any alternative control devices and methods that enable operation of control loop 700 as described herein are used.

Outer DC link voltage control loop 700 facilitates voltage control of first hybrid HVDC converter system 308 and second HVDC converter system 334 through feed-forward signals to outer volt-VAR control loop 600 (shown in FIG. 6) as described further below. Control loop 600 and control loop 700 together define an IGBT converter, i.e., vernier AC/DC controller with a PLL.

Outer DC link voltage control loop 700 includes a summing junction 708 that receives $V_{DC\text{-}ver\text{-}cmd}$ signals and subtracts feedback signal $V_{DC\text{-}ver\text{-}fbk}$ representative of the real-time voltage of DC link 330 (shown in FIG. 3) to generate $\Delta V_{d\text{-}ver}$ signals. Control loop 700 further includes a proportional-integral (PI) controller module 710 that receives $\Delta V_{d\text{-}ver}$ signals and generates DC current signals $I_{d\text{-}ver}$. Control loop 700 also includes an integrator module 712 that receives DC current signals $I_{d\text{-}ver}$ and integrates the signals between the limits of a predetermined minimum current rating ($I_{d\text{-}ver\text{-}rating\text{-}min}$) of DC/DC converter stage 328 and a predetermined maximum current rating ($I_{d\text{-}ver\text{-}rating\text{-}max}$) of DC/DC converter stage 328. The resultant integrated signals are vernier DC link voltage control current command signals, i.e., $I_{d\text{-}ver\text{-}cmd}$. The output of Outer DC link voltage control loop 700 is used by an inner current control loop (not shown in FIG. 7) as discussed further below.

As such, the relationship between outer volt-VAR control loop 600 and the reactive power control associated with AC buses 316 and the DC link voltage ($V_{Dc\text{-}ver}$) control associated with outer DC link voltage control loop 700 facilitates a current limiting strategy for vernier 322. For example, and without limitation, in the event of a severe transient on HVDC transmission system 300, DC link voltage $V_{DC\text{-}ver}$ control facilitates both voltage control of $V_{AC\text{-}1}$ on AC buses 316 as a function of $I_{q\text{-}ver}$ generated by vernier 322 and control of $V_{vernier}$ on DC buses 332 as a function of the upper and lower current limitation on DC/DC converter stage 328.

To further facilitate the current limiting strategy for vernier 322, the current control commands, i.e., vernier DC link voltage control current command signals $I_{d\text{-}ver\text{-}cmd}$ associated with the DC voltage control features of control loop 700 are given priority over the Volt-VAR control commands, i.e., vernier reactive power (Q) current command signals, i.e., $I_{q\text{-}ver\text{-}cmd}$ associated with control loop 600. Therefore, the $I_{d\text{-}ver\text{-}cmd}$ signals are given priority over the $I_{q\text{-}ver\text{-}cmd}$ signals because it is more important to maintain the DC link voltage $V_{DC\text{-}ver}$ than controlling the voltage $V_{AC\text{-}1}$ on AC buses 316 through controlling the reactive power injection (Q) through $I_{q\text{-}ver}$.

Moreover, to facilitate the current limiting strategy for vernier 322, the $Q_{cmd}$ signals from monitoring and control system 200 are transmitted to the slow-acting outer VAR control loop 601 after limiting module 602 and removal of the real-time $Q_{fbk}$ such that under typical circumstances, the values of $V_{AC\text{-}1}$ are relatively slow-changing under volt-VAR control of control loop 600. In addition, such values for $V_{AC\text{-}1}$ are fed-back to control loop 600 for all three phases as $V_{AC\text{-}a,b,c}$ to the faster-acting outer voltage control loop 610 to further slow down changes to $V_{AC\text{-}1}$. As a result of slowly regulating the AC voltage $V_{AC\text{-}1}$ on AC buses 316, reactive power Q supplied to buses 316 through vernier 322 is also slowly regulated by such control of vernier 322.

As described above, the reactive power support by vernier 322 is driven towards a value $Q_{cmd}$ that is transmitted from monitoring and control system 200 and/or the SCADA/EMS level. As outer VAR loop 601 slowly reacts to change the reactive power contribution through regulation of $I_{q\text{-}ver}$, the voltage $V_{AC\text{-}1}$ will slowly drift. The allowable drift is determined by the limits $V_{AC\text{-}cmd\text{-}max}$ and $V_{AC\text{-}cmd\text{-}min}$, both of which may also be determined by monitoring and control system 200 and/or the a SCADA/EMS level. In addition, $Q_{cmd}$ may be determined based on a fault coordination scheme and/or a commutation support scheme. Both the commutation support and fault coordination schemes can work in cooperation with control schemes 400 and 500 (shown in FIGS. 4 and 5, respectively) for generating firing angle commands $\alpha_{cmd}$ while regulating values of $Q_{cmd\text{-}max}$, $Q_{cmd\text{-}min}$, $V_{AC\text{-}cmd\text{-}max}$, and $V_{AC\text{-}cmd\text{-}min}$ in control loop 600.

Such coordinated control may facilitate avoiding commutation failure and facilitate smoother and faster recoveries from disturbances on HVDC transmission system 300 as compared to conventional LCC- and CCC-control. Under such conditions, vernier 322 may be operated in a manner similar to a static synchronous compensator (STATCOM).

Referring to FIGS. 4, 6, 5, and 7, in the event that the firing angle command signal $\alpha_{cmd}$ (shown in FIGS. 4 and 5) increases to a value above firing command offset signal α2 (shown in FIG. 4) as a result of a transient, reactive power consumption by first hybrid HVDC converter system 308 will increase. Fast-acting voltage control loop 610 sensing the real-time change in voltage on AC buses 316 facilitates increasing the vernier reactive power control current command signal $I_{q\text{-}ver\text{-}cmd}$ to increase Q control current $I_{q\text{-}ver}$ (shown in FIG. 3) to quickly provide at least a portion of the increased reactive power consumption. Then, the slower acting firing angle/gating module 420 and firing angle/gating module 520 act to restore $\alpha_{cmd}$ and extinction angle γ to their previous values as the slower-acting outer VAR control loop 601 slowly used the VAR control features to reduce the reactive power support from vernier 322.

As such, $V_{DC\text{-}ver\text{-}cmd}$ signals (shown in FIGS. 3, 4, and 5 as well as FIG. 7) are regulated through a "bleeding" scheme that includes subtracting real-time $V_{DC\text{-}ver}$ feedback signals, i.e., $V_{DC\text{-}ver\text{-}fbk}$ signals (also shown in FIGS. 4 and 5 as well as FIG. 7) upstream of the associated integration modules (module 450 shown in FIG. 4, module 550 shown in FIG. 5, and module 712 shown in FIG. 7). Such "bleeding" mechanism facilitates regulating the $V_{DC\text{-}ver\text{-}cmd}$ signals away from the associated integrator module limits, thereby reducing the potential for sharp changes in the vernier command signals $V_{DC\text{-}ver\text{-}cmd}$ as well as vernier Q current command signals $I_{q\text{-}ver\text{-}cmd}$ and vernier DC link voltage control current command signals $I_{d\text{-}ver\text{-}cmd}$ (shown in FIGS. 6 and 7, respectively). Therefore, during severe transients on HVDC transmission system 300, a smooth ramp-down from control system limits and constraints, eventual blocking of regulating control signals to DC/DC converter stage 328 until the transient is at least arrested, and a subsequent smooth recovery is facilitated. In some embodiments, DC link voltage $V_{DC\text{-}ver}$ may be held substantially constant to further mitigate the disturbance.

The variable constraints, the current limiting scheme, the bleeding scheme, the fault coordination scheme, and the commutation support scheme described above are not limiting, and any constraints that enable operation of vernier 322 and monitoring and control system 200 as described herein are used, including, without limitation, volt-VAR droop.

Figure 8:
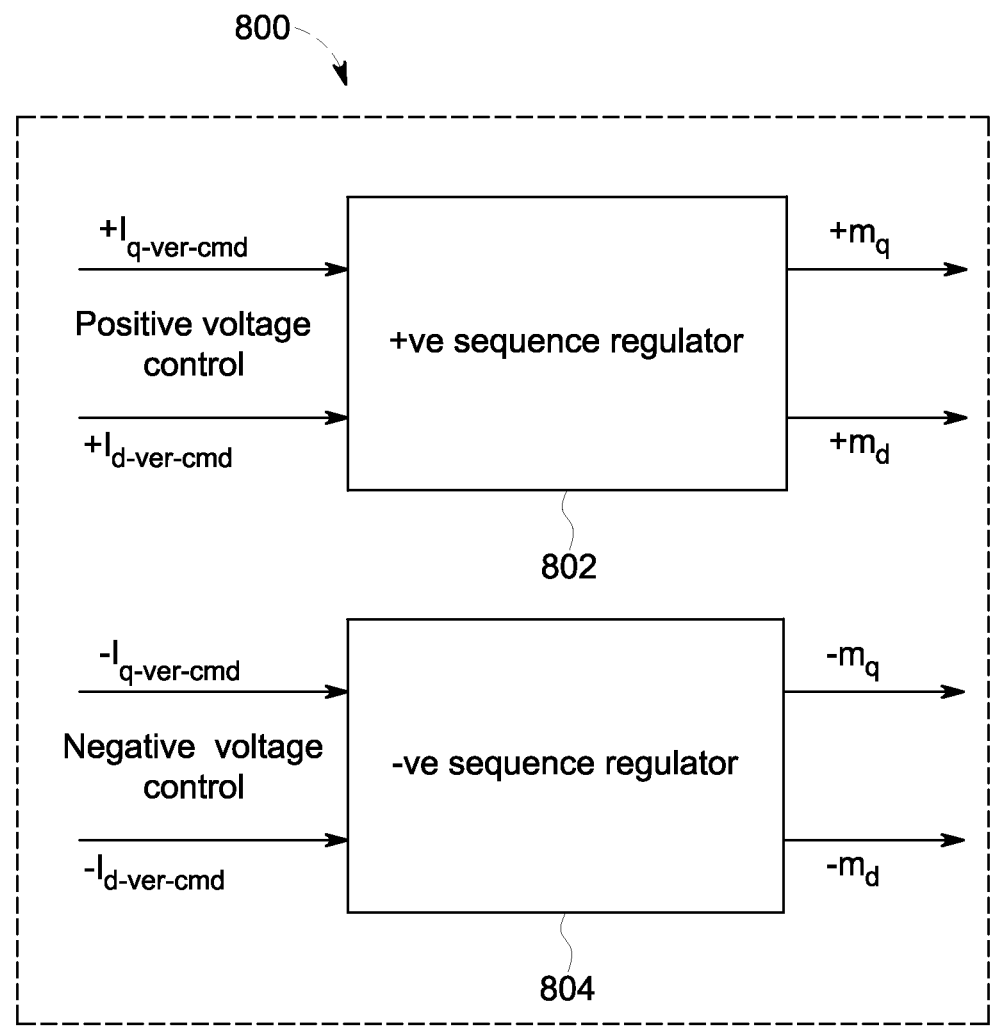
FIG. 8 is a schematic view of a low-order, AC-side harmonic controller for a SCC that may be used with the HVDC transmission system shown in FIG. 3.

FIG. 8 is a schematic view of a plurality of inner current control loops 800 a self-commutated converter (SCC), i.e., vernier 322 (shown in FIG. 3) that may be used with HVDC transmission system 300 (shown in FIG. 3) and implemented in monitoring and control system 200 (shown in FIG. 2). Inner current control loop 800 includes a positive sequence regulator 802 that facilitates positive sequence voltage control and a negative sequence regulator 804 that facilitates negative sequence voltage control. Modulation indices +$m_q$, +$m_d$, −$m_q$ and −$m_d$ are used to generate gating signals for AC/DC converter stage 326 (shown in FIG. 3). Also, the modulation indices (not shown) facilitate modulating the current commands to facilitate reducing harmonics on AC buses 316.

Figure 9:
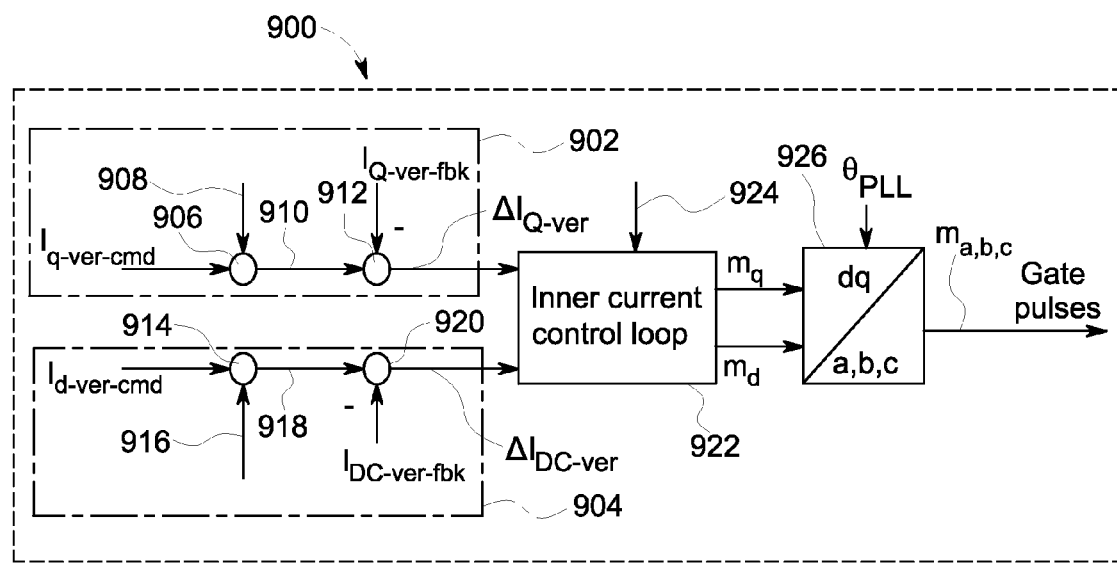
FIG. 9 is a schematic view of an additional low-order, AC-side harmonic controller for a SCC that may be used with the HVDC transmission system shown in FIG. 3.

FIG. 9 is a schematic view of additional inner current control loops 900 for a self-commutated converter (SCC), i.e., vernier 322 shown in FIG. 3) that may be used with HVDC transmission system 300 (shown in FIG. 3) and implemented in monitoring and control system 200 (shown in FIG. 2) Inner current control loops 900 include a first, i.e., a reactive power current command channel 902 and a second, i.e., a DC link current command channel 904. Reactive power current command channel 902 includes a first summing module 906 that receives $I_{q\text{-}ver\text{-}cmd}$ from control scheme 600 (shown in FIG. 6) and real-time DC-side voltage signals 908 from DC buses 332 (shown in FIG. 3) to generate a signal 910. Signals 908 are representative of an amplitude of the DC ripple resulting from rectification by first converter system 308.

Channel 902 also includes a second summing module 912 that receives a reactive power current command feedback signal ($I_{q\text{-}ver\text{-}fbk}$) from control scheme 600 (only shown in FIG. 9), subtracts $I_{q\text{-}ver\text{-}fbk}$ from signal 910 and generates a reactive power current command differential signal ($\Delta I_{q\text{-}ver}$).

DC link current command channel 904 includes a first summing module 914 that receives $I_{d\text{-}ver\text{-}cmd}$ from control scheme 700 (shown in FIG. 7) and real-time DC-side voltage signals 916 from DC buses 332 (shown in FIG. 3) (that may, or may not, be similar to signals 908) to generate a signal 918. Channel 904 also includes a second summing module 920 that receives a DC link current command feedback signal ($I_{d\text{-}ver\text{-}fbk}$) from control scheme 700 (only shown in FIG. 9), subtracts $I_{d\text{-}ver\text{-}fbk}$ from signal 918 and generates a DC link current command differential signal ($\Delta I_{d\text{-}ver}$).

Inner current control loops 900 also include an inner current control loop module 922 that receives $\Delta I_{q\text{-}ver}$, and $\Delta I_{d\text{-}ver}$ as well as real-time feed-forward measurement signals 924, e.g., and without limitation, $I_{d\text{-}ver\text{-}fbk}$, $I_{q\text{-}ver\text{-}fbk}$, real-time AC frequency, and system characteristics, e.g., system inductance values.

Inner current control loop 922 generates quadrature axis modulation index $m_q$ and direct axis modulation index $m_d$. AC-side harmonic controller 900 further includes a gate pulse generator 924 that receives modulation indices $m_q$ and $m_d$ and phase angle signals $\theta_{PLL}$ transmitted from PLL 614 (shown in FIG. 6) and generates gate pulses $m_{a,b,c}$ for transmission to the gates of the IGBTs in AC/DC converter stage 326 (shown in FIG. 3). Real-time feed-forward measurement signals 924 are used such that predetermined measurements associated with system disturbances are rejected to reduce a potential for AC-side harmonic controller 900 to over-react to such disturbances and exacerbating system instability.

Figure 10:
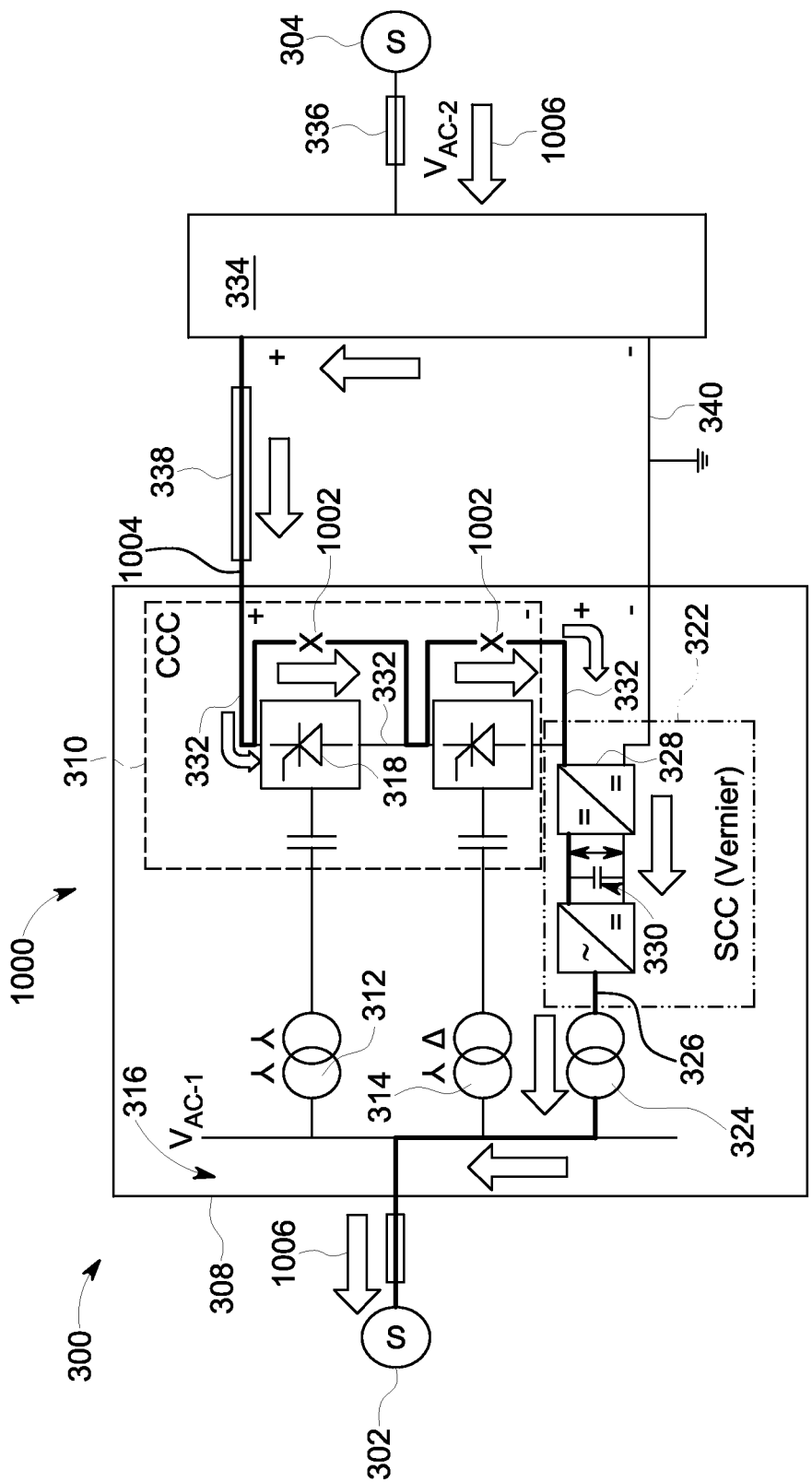
FIG. 10 is a schematic view of an exemplary black start configuration that may be used with the HVDC transmission system shown in FIG. 3.

FIG. 10 is a schematic view of an exemplary black start configuration 1000 that may be used with HVDC transmission system 300 and at least partially implemented in monitoring and control system 200 (shown in FIG. 2). HVDC transmission system 300 includes a plurality of switch devices 1002, each switch device 1002 coupled in parallel with thyristors 318 of CCC 310. In the exemplary embodiment, switch device 1002 is manually and locally operated to close to bypass the associated thyristors 318. Alternatively, switch device 1002 may be operated remotely. Second HVDC converter system 334 is similar to first converter system 308.

Also, in the exemplary embodiment, a black start flow path 1004 is defined from AC grid 304 through second HVDC converter system 334, HVDC transmission bus 338, switch devices 1002, vernier 322, to AC source 302. As such, vernier 322 is bidirectional. For example, for those periods when no electric power generators are in service within AC source 302, electric power is transmitted from AC grid 304 through system 300 to AC source 302 to power loads thereon. Based on the direction of power flow, either of second HVDC converter system 334 or vernier 322 controls the DC line current. The DC bus voltage in this mode is substantially equal to the $V_{vernier}$ generated by vernier 322.

In black start operation, HVDC transmission system 300 starts with substantially most devices between HVDC transmission bus 338 and AC source 302 substantially deenergized. Transformers 312 and 314 are electrically isolated from AC buses 316 and CCC 310. Switch devices 1002 are closed, either locally or remotely, thereby defining a portion of path 1004 that bypasses transformers 312 and 314 and thyristors 318, and directly coupling AC/DC converter stage 328 of vernier 322 with HVDC transmission bus 338. Also, in black start operation, AC/DC converter stage 328 is charged through switch devices 1002 which in turn energizes DC link 330 and ADC/DC converter stage 326, all as indicated by arrows 1006. AC/DC converter module 326 generates sufficient AC power to at least partially energize AC buses 316 and transmit AC power to AC source 302. Further, in black start operation, control scheme 600 for AC/DC converter stage 326, i.e., the at least one volt-VAR control scheme and vernier DC control scheme 700 are configured to operate vernier 322 as a DC-to-AC converter to control current flow therethrough.

Figure 11:
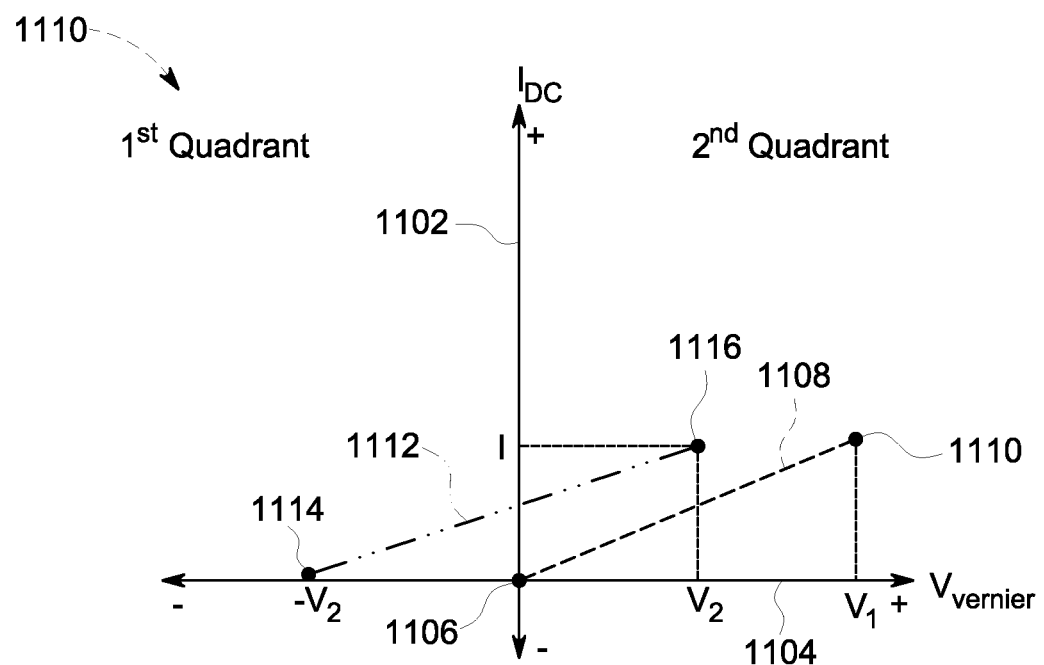
FIG. 11 is a graphical view of the quadrature relationship between DC voltage and DC current with respect to a SCC, i.e., a vernier that may be used with the HVDC transmission system shown in FIG. 3.

FIG. 11 is a graphical view, i.e., a graph 1100 of the quadrature relationship between DC voltage and DC current with respect to SCC, i.e., vernier 322 (shown in FIG. 3) that may be used with HVDC transmission system 300 (shown in FIG. 3) and implemented in monitoring and control system 200 (shown in FIG. 2). As described above, DC/DC converter stage 328 (shown in FIG. 3) operates in at least two of the four quadrants of the DC voltage-DC current plane as a function of the quadrature relationship of bipolar DC voltages and bi-directional DC current.

Graph 1100 includes a y-axis 1102 that represents current, i.e., $I_{DC}$ (shown in FIG. 3) and an x-axis 1104 that represents $V_{vernier}$ (shown in FIG. 3) as induced by DC/DC converter stage 328. Y-axis 1102 and x-axis 1104 intersect to define an origin 1106, where voltage and current have zero values and the associated power generation, a function of both current and voltage, is zero. A first curve 1108 extends from origin 1106 to a point 1110 partially defined by a first voltage rating $V_1$ of vernier 322 through a predetermined voltage range, and a current rating I. First curve 1108 represents operation of a known DC/DC converter on a known SCC that is designed, constructed, and operated with known characteristics. A second curve 1112 extends from a point 1114 defined by a negative voltage, i.e., $-V_2$ current equals zero to a point 1116 partially defined by a second voltage rating $V_2$ of vernier 322 through the predetermined voltage range, and the current rating $I_2$. Second curve 1112 represents operation of DC/DC converter stage 328 using the control methods described herein, including, without limitation, pulse width modulation (PWM) control methods. Origin 1106 to $-V_2$ defines a negative DC voltage polarity range and origin 1106 to $V_2$ defines a positive DC voltage polarity range. As such, the SCC, i.e., vernier 322 described herein facilitates approximately a 50% voltage rating reduction of DC/DC converter stage 328 for given current I.

Figure 12:
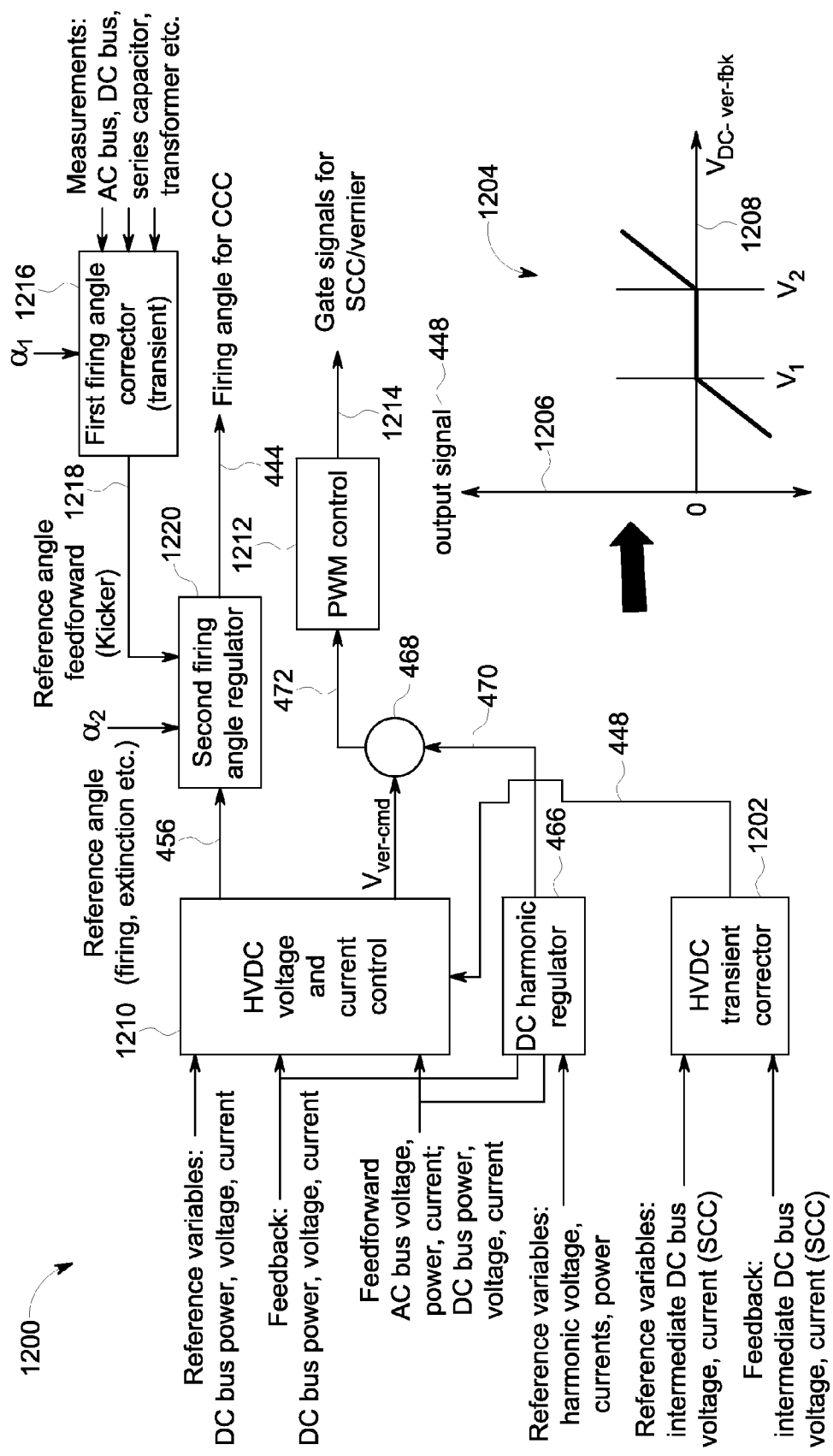
FIG. 12 is a schematic high-level view of the control scheme for the first hybrid HVDC converter system shown in FIG. 4.

FIG. 12 is a schematic high-level view 1200 of control scheme 400 (shown in FIG. 4) (or 500 as shown in FIG. 5) for first hybrid HVDC converter system 308 (shown in FIG. 3), hereon referred to as control scheme view 1200. Control scheme view 1200 includes a HVDC transient corrector 1202 that includes vernier constraints module 446 (shown in FIG. 4). HVDC transient corrector 1202 receives, in addition to $V_{DC\text{-}ver\text{-}fbk}$, feedback and reference variable signals associated with DC bus voltages and currents and generates vernier constraints signals 448.

FIG. 12 shows one possible programming scheme for transient corrector 1202 with respect to vernier constraints signals 448 as a graph 1204. Graph 1204 includes a y-axis 1206 representative of output signal 448 and an x-axis 1208 representative of $V_{DC\text{-}ver\text{-}fbk}$. HVDC transient corrector 1202 is related to x-axis 1208 as follows. If $V_{DC\text{-}ver\text{-}fbk}$ lies between two pre-determined threshold values $V_1$ and $V_2$, the output is zero, i.e., vernier constraints module 446 does not alter either of $\alpha_{cmd}$ and $V_{DC\text{-}ver\text{-}cmd}$ (both shown in FIG. 4). If the value of $V_{DC\text{-}ver\text{-}fbk}$ goes above or below the thresholds, the output becomes greater than or less than zero. The droop profile slopes are predetermined and a lookup table may be used to implement this feature. Therefore, for relatively stable conditions with small DC voltage transients between $V_1$ and $V_2$, control action from HVDC transient corrector 1202 is not warranted. However, for those transients that are manifested in the DC voltage exceeding threshold values $V_1$ and $V_2$, possibly indicative of a fault condition on the DC side of first hybrid HVDC converter system 308, droop control facilitates accelerated responses by vernier 322.

Control scheme view 1200 also includes HVDC voltage and current control 1210 that receives signals 448 as well as signals associated with reference variables, feedback, and feed-forward of DC bus power, voltage, and current as well as feed-forward signals associated with AC bus voltage, current, and power. HVDC voltage and current control 1210 generates $V_{DC\text{-}ver\text{-}cmd}$ signals and raw CCC thyristor voltage command signals 456.

Control scheme view 1200 further includes DC harmonic regulator 466 that receives signals associated with reference variables, of harmonic voltage, currents, and power as well as feed-forward signals associated with AC and DC bus voltages, currents, and powers to generate signals 470. Summing module 468 receives $V_{DC\text{-}ver\text{-}cmd}$ signals and signals 470 from DC harmonic regulator 466 and generates PWM signals 472 that are transmitted to a PWM control module 1012 that subsequently transmits IGBT gate signals 1214 to vernier 322.

Control scheme view 1200 also includes a first firing angle regulator 1216 that receives thyristor firing command offset signal a1 and measurements associated with AC buses 316, DC buses 332, series capacitors 320 (shown in FIG. 3), and transformers 312, 314, and 324 (all shown in FIG. 3). First firing angle regulator 1216 includes converter equations module 458, summing module 462, and thyristor firing command limit module 464 (both shown in FIG. 4) and generates a reference angle feed-forward kicker signal 1218 that is transmitted through feed-forward loop 440 (shown in FIG. 4). Control scheme view 1200 further includes a second firing angle regulator 1220 that receives reference angle feed-forward kicker signal 1218 and firing angle command offset signal α2. Second firing angle regulator 1220 includes summing module 438 and gain module 442 and generates an output signal 444 (shown in FIG. 4) that generates firing angle command signal $α_{cmd}$ for firing thyristors 318 in CCC 310.

The above-described hybrid HVDC transmission systems provide a cost-effective method for transmitting HVDC power. The embodiments of control systems for high voltage direct current (HVDC) converter systems and associated HVDC transmission systems include a self-commutated converter (SCC) coupled to a capacitor commutated converter (CCC). The exemplary embodiments describe the SCCs and CCCs as including a plurality of semi-conductor based switches. Specifically, the SCCs include insulated gate bipolar transistors (IGBTs) and the CCCs include thyristors. The combination of the SCC (vernier) and the CCCs regulate the DC voltage ($V_{DC}$) on the DC-side of the converters within established parameters. The physical size and ratings of the SCC is much smaller than those of the CCCs. As such, the CCCs generate a thyristor voltage ($V_{th}$) that makes up the majority of total DC voltage induced ($V_T$) and the SCC generates a much smaller voltage. Therefore, the CCCs exercise broad control of $V_T$ and the SCC exercises narrow, or vernier control of $V_T$ and generates a $V_{vernier}$. The sum of $V_{vernier}$ and $V_{th}$ is $V_T$, and $V_T$ is regulated to provide for predetermined values of $V_{DC}$ after accounting for the voltage drop across the transmission system. For those HVDC transmission systems with two converter systems, i.e., one converter system on each end of the HVDC transmission system, $V_{DC}$ for the HVDC transmission system is controlled by only one of the two converter systems to regulate current transmission through the HVDC transmission system, i.e., $I_{DC}$.

In the exemplary embodiments described herein, the converter control systems include at least one of a current control (CC) loop that generates $V_{cmd\text{-}CC}$ control signals and a voltage control (VC) loop that generates $V_{cmd\text{-}VC}$ control signals to regulate $V_{DC}$, and therefore, $I_{DC}$ through subsequent generation of firing command signals to the thyristors and the IGBTs. These firing command signals are proportioned between the SCC and CCCs to regulate each of $V_{vernier}$ and $V_{th}$ in the appropriate proportions. The SCCs described herein include an AC-to-DC (AC/DC) converter stage coupled to a DC-to-DC (DC/DC) converter stage with a DC link therebetween. The DC link has an induced voltage thereon ($V_{DC\text{-}ver}$) and the control systems described herein facilitate regulating $V_{DC\text{-}ver}$.

An exemplary technical effect of the methods, systems, and apparatus described herein includes at least one of: (a) controlling IGBT and thyristors firing commands between a SCC and a CCC to regulate each of $V_{vernier}$ and $V_{th}$ in the appropriate proportions, thereby sharing control between the SCC and the CCCs during steady state and dynamic conditions, including significant transients on the HVDC transmission system, thereby reducing undershoots and overshoots of control actions in response to the dynamic conditions; (b) using feed-forward and feedback signals for maintaining control system signal limits such that the probability of hitting these limits is significantly reduced, thereby facilitating smoother control and accelerated recovery in the event of large disturbances on the HVDC transmission system; (c) using feed-forward and feedback signals to reduce the potential for mode shifts between current control loops and the voltage control loops; and (d) controlling firing control of IGBTs and thyristors in the event a control limit being reached, thereby at least temporarily slowing firing control of the thyristors and IGBTs and facilitating restoring effective control once the limits are adjusted and/or the command signals move away from the limits.

Also, an exemplary technical effect of the methods, systems, and apparatus described herein includes at least one of: (e) decreasing the dynamic ratings of the SCC and CCCs through the use of control mechanisms that include integrators with upper and lower parameter setpoints, thereby also reducing the potential for firing angle control signals from hitting a limit; (f) increasing the range of fine control during transient conditions by reducing the hitting of control limits and extending the operation of the SCC through a linear control region; (g) increasing the range of fine control during transient conditions by incremental operation of the CCCs such that an operational bandwidth having adequate linear, fine control through the SCC is returned; and (h) reducing harmonics on the DC-side of the converter due to DC ripple effects.

Further, an exemplary technical effect of the methods, systems, and apparatus described herein includes at least one of: (i) regulating the extinction angles associated with adjacently-firing thyristor valves and IGBT valves such that a regulated extinction angle value is determined from extinction angle feedback measurements and extinction angle setpoints and is used to regulate and/or limit the firing angle, thereby reducing firing angle values to decrease a potential for commutation failure of the thyristor and IGBT valves; (j) regulating thyristor and IGBT firing command signals to lower values to control the power factor on the AC-side to reduce the reactive power consumption by the rectification process, thereby facilitating regulation of the AC-side of the converter systems; (k) facilitating a reduction in the size and number of capacitive devices required at the switchyard of the converter system, thereby resulting in a smaller footprint for the converter system hardware; and (l) using indirect control of the firing angles by setting a minimum value for the associated extinction angles to further reduce reactive power consumption, wherein in addition to direct control of the firing angles, such indirect control of the firing angle facilitates generating upper firing angle limits.

Moreover, an exemplary technical effect of the methods, systems, and apparatus described herein includes at least one of: (m) decreasing harmonics on the AC-side of the converter systems through the use of one of inner current control loops and positive and negative sequence current regulators to generate current command signals, wherein such current command signals are limited to the upper and lower current ratings of the converter systems as well as parameters established through transient control to facilitate maintaining DC link voltage and during significant transients on the HVDC transmission system; (n) facilitating a smoother transition through transients by using a DC voltage feedback signal to constrain commands to the SCC, thereby reducing a potential for sharp changes to the SCC command signals; (o) regulating the value of the associated firing angles such that use of tap changing transformers to regulate the firing angles is significantly reduced; and (p) regulating the operation of the CCCs such that the size and number of the associated capacitor banks and the associated switchgear may be reduced, thereby decreasing the footprint of the converter systems and the costs of installation and maintenance thereof.

In addition, an exemplary technical effect of the methods, systems, and apparatus described herein includes at least one of: (q) facilitating a smooth ramp-down from control system limits and constraints during severe transients on HVDC transmission system by subtracting real-time SCC voltage feedback signals upstream of the associated integration modules, thereby regulating the SCC voltage away from the associated integrator module limits, thereby reducing the potential for sharp changes in the SCC command signals; (r) reducing accelerated reactions to disturbances on the HVDC transmission system, thereby further facilitating system stability through using integrators throughout the control systems and variable limits on at least some of the integrators, such variable limits a function of real-time system conditions as determined by HVDC transmission system voltages and currents, feed-forward signals such as SCC DC link voltage control current command signals, and equipment limitations such as minimum and maximum current ratings of the DC/DC converter stage; and (s) enabling black starts using the HVDC transmission systems through the bi-directional SCC.

Exemplary embodiments of HVDC transmission systems for coupling power generation facilities and the grid, controls systems thereof, and methods for operating the same, are described above in detail. The HVDC transmission systems, HVDC converter systems, associated control systems, and methods of operating such systems are not limited to the specific embodiments described herein, but rather, components of systems and/or steps of the methods may be utilized independently and separately from other components and/or steps described herein. For example, the methods may also be used in combination with other systems requiring HVDC transmission and methods, and are not limited to practice with only the HVDC transmission systems, HVDC converter systems, associated control systems, and methods as described herein. Rather, the exemplary embodiment can be implemented and utilized in connection with many other high power conversion applications that currently use LCCs and/or CCCs, e.g., and without limitation, multi-megawatt sized drive applications and back-to-back connections where black start may not be required.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a hybrid high voltage direct current (HVDC) converter system, the hybrid HVDC converter system including at least one direct current (DC) bus, at least one capacitor commutated converter (CCC), at least one self-commutated converter (SCC), the at least one CCC and the at least one SCC coupled in series to the at least one DC bus, the at least one CCC configured to induce a first DC voltage on the at least one DC bus, the at least one SCC configured to induce a second DC voltage on the at least one DC bus, the first DC voltage and the second DC voltage summed to define a total DC voltage induced on the at least one DC bus, said method comprising at least one of:
    regulating the total DC voltage induced on the at least one DC bus comprising regulating the first DC voltage through the at least one CCC and regulating the second DC voltage through the at least one SCC substantially simultaneously;
    regulating the total DC voltage induced on the at least one DC bus comprising regulating the second DC voltage through the at least one SCC; and
    regulating the total DC voltage induced on the at least one DC bus comprising regulating the first DC voltage through the at least one CCC;
    wherein the at least one CCC and the at least one SCC are coupled in series.

2. The method in accordance with claim 1, wherein the hybrid HVDC converter system further includes at least one alternating current (AC) bus, said method further comprising regulating the at least one SCC to regulate at least one of an AC frequency, an AC voltage, and an AC current on the at least one AC bus.

3. The method in accordance with claim 2, wherein the hybrid HVDC converter system further includes a control system configured to regulate the at least one SCC, the control system includes a volt-VAR control loop and a DC link control loop, wherein the at least one SCC includes an AC/DC converter stage, a DC/DC converter stage, and a DC link extending therebetween, wherein regulating the at least one SCC to regulate at least one of an AC frequency, an AC voltage, and an AC current on the at least one AC bus comprises at least one of:
    using the volt-VAR control loop to regulate reactive power injection through the at least one AC bus;
    using at least a portion of reactive power generated by the AC/DC converter stage to facilitate reducing a reactive power requirement of at least one AC filter to a predetermined range, thereby further reducing voltage support requirements from the at least one capacitive device to the hybrid HVDC converter system;
    using measurements of current on the at least one AC bus to regulate the hybrid HVDC converter system to inject low order harmonic currents into the at least one AC bus, thereby facilitating decreasing a requirement of low order AC harmonic filters to compensate for low order harmonic currents;
    using the DC link control loop to at least partially regulate a voltage induced on the DC link; and determining a voltage transient condition on the at least one DC bus and prioritizing regulating the voltage induced on the DC link over regulating reactive power injection through the at least one AC bus.

4. The method in accordance with claim 1, wherein the at least one CCC includes a plurality of thyristor valves, wherein regulating the first DC voltage through the at least one CCC comprises regulating a firing angle value of the plurality of thyristor valves to approximately a firing command reference value.

5. The method in accordance with claim 4, wherein regulating the first DC voltage through the at least one CCC and regulating the second DC voltage through the at least one SCC substantially simultaneously comprises:
   determining a voltage transient condition on the at least one DC bus;
   determining if the second DC voltage induced by the at least one SCC is approaching a predetermined parameter; and
   regulating the firing command reference value to increase a portion of control of the total DC voltage through regulating the first DC voltage induced by the at least one CCC, thereby facilitating increasing a margin of the second DC voltage to the predetermined parameter.

6. The method in accordance with claim 5, wherein increasing a margin of the second DC voltage to the predetermined parameter comprises increasing an operational bandwidth of the at least one SCC to regulate the total DC voltage induced on the at least one DC bus.

7. The method in accordance with claim 4, wherein the at least one CCC includes at least one series capacitive device configured to provide voltage support to the hybrid HVDC converter system, wherein regulating the firing angle value of the plurality of thyristor valves to approximately a firing command reference value comprises regulating the firing angle of the plurality of thyristor valves to reduce a reactive power requirement of the plurality of thyristor valves to a predetermined range, thereby reducing voltage support requirements from the at least one series capacitive device of the hybrid HVDC converter system and reducing voltage stresses induced on the plurality of thyristor valves.

8. The method in accordance with claim 7, wherein the hybrid HVDC converter system further includes at least one AC filter, wherein regulating the firing angle value of the plurality of thyristor valves to approximately a firing command reference value comprises regulating the firing angle of the plurality of thyristor valves to reduce a reactive power requirement of the at least one AC filter to a predetermined range, thereby further reducing at least one of voltage support requirements and a reactive power nameplate rating from the at least one series capacitive device of the hybrid HVDC converter system.

9. The method in accordance with claim 1, wherein the at least one SCC includes an AC/DC converter stage, a DC/DC converter stage, and a DC link extending therebetween, wherein the DC/DC converter stage includes a plurality of semiconductor switching devices configured to regulate the second DC voltage through pulse width modulation (PWM), wherein regulating the second DC voltage through the at least one SCC comprises regulating the PWM, thereby operating the DC/DC converter stage to induce the second DC voltage in at least two quadrants of a four quadrant voltage-current system.

10. The method in accordance with claim 9, wherein the four quadrant voltage-current system is defined by a voltage axis and a current axis, wherein operating the DC/DC converter stage to induce the second DC voltage in at least two quadrants of a four quadrant voltage-current system comprises regulating the second DC voltage between a positive DC voltage polarity range and a negative DC voltage polarity range, thereby facilitating a reduction of a voltage rating of the at least one SCC.

11. The method in accordance with claim 1, wherein the hybrid HVDC converter system further includes at least one AC bus, wherein the at least one transformer has a tap changing function, wherein regulating the total DC voltage induced on the at least one DC bus comprising regulating the first DC voltage through the at least one CCC and regulating the second DC voltage through the at least one SCC substantially simultaneously comprises:
   determining if there is an electric power transient associated with at least one of a measured real-time voltage value, current value, power value on the at least one AC bus, and at least one of a measured real-time voltage value, current value, and power value on the at least one DC bus; and
   regulating the second DC voltage generated by the at least one SCC, thereby indirectly regulating AC voltages, currents, and powers and DC voltages, currents, and powers of the hybrid HVDC converter system through decreasing the control action required of the at least one CCC to maintain the total DC voltage, thereby facilitating substantially reducing tap changing operation of the at least one transformer.

12. The method in accordance with claim 1, wherein the hybrid HVDC converter system further includes a control system configured to regulate the at least one SCC, the control system includes at least one module configured to generate control signals to facilitate operation of the hybrid HVDC converter system during transient conditions thereon, wherein regulating the second DC voltage through the at least one SCC comprises:
   determining a voltage transient condition on the at least one DC bus; and
   generating a voltage control signal configured to regulate a voltage induced on the DC link, wherein the voltage control signal is at least partially based on a DC link voltage profile as a function of a measured real-time voltage of the DC link and at least one of a substantially constant-value profile and a droop profile.

13. The method in accordance with claim 1, wherein the at least one CCC includes a plurality of thyristor valves, wherein regulating the total DC voltage induced on the at least one DC bus comprising regulating the second DC voltage through the at least one SCC comprises:
   determining if at least one of at least one AC bus outage and a black start condition exists on at least a portion of the hybrid HVDC converter system;
   substantially removing the at least one CCC from service through at least one of closing a switch coupled to the at least one DC bus and at least one of bypassing the at least one CCC and regulating the firing angle values of the plurality of thyristor valves such the first DC voltage is substantially zero;
   regulating the at least one SCC to induce the second DC voltage on the at least one DC bus such that the total DC voltage is substantially equal to the second DC voltage; and
   regulating the at least one SCC of the hybrid HVDC converter during at least one of electrical outage conditions and black start conditions to induce an AC voltage of predetermined frequency and amplitude to perform a black start on at least a portion of the hybrid HVDC converter system.

14. The method in accordance with claim 1, wherein regulating the second DC voltage through the at least one SCC comprises:
- determining a measured real-time value of DC ripple of the total DC voltage induced on the at least one DC bus; and
- regulating the second DC voltage through the at least one SCC to decrease the value of the DC ripple.

15. The method in accordance with claim 1, wherein the hybrid HVDC converter system further includes at least one of an AC filter, a DC filter, and at least one AC bus, wherein regulating the second DC voltage through the at least one SCC comprises:
- determining if an unbalance exists between at least one of a measured real-time voltage and current on the at least one AC bus and a measured real-time voltage on the at least one DC bus; and
- inducing an AC voltage having a predetermined frequency on the at least one DC bus, wherein the frequency of the AC voltage induced on the DC bus is substantially similar to the second harmonic frequency of a fundamental frequency of an AC voltage measured on the at least one AC bus, thereby facilitating a reduction of the nameplate rating of at least one of the AC filter and DC filter, thereby also reducing the effect of classical AC and DC system interaction.

16. The method in accordance with claim 1, wherein the hybrid HVDC converter system further includes at least one AC bus, wherein the at least one DC bus and the at least one AC bus have a physical proximity to each other that facilitates inductive coupling therebetween, wherein regulating the second DC voltage through the at least one SCC comprises:
- determining if an AC voltage at a fundamental frequency is induced on the at least one DC bus by the at least one AC bus;
- measuring an amplitude and phase angle of the AC voltage induced on the at least one DC bus by the at least one AC bus; and
- injecting an AC voltage on the at least one DC bus through the at least one SCC, the phase angle and amplitude of the injected AC voltage reduces the AC voltage induced on the at least one DC bus by the at least one AC bus.

17. A method for controlling a hybrid high voltage direct current (HVDC) converter system, the hybrid HVDC converter system including at least one alternating current (AC) bus and at least one direct current (DC) bus, at least one capacitor commutated converter (CCC), and at least one self-commutated converter (SCC), the at least one CCC and the at least one SCC coupled in series to at least one DC bus, the at least one CCC configured to induce a first voltage on the at least one DC bus, the at least one SCC configured to induce a second voltage on the at least one DC bus, the first voltage and the second voltage summed to define a total DC voltage induced on the at least one DC bus, said method comprising:
- operating the hybrid HVDC converter system during steady-state operating conditions comprising regulating the at least one CCC to induce the first voltage on the at least one DC bus at a value substantially similar to the total DC voltage; and
- regulating the at least one SCC to induce the second voltage on the at least one DC bus at a residual voltage that is substantially equal to the total DC voltage minus the first voltage, thereby using the at least one SCC to finely regulate at least one of current and voltage on at least one of the at least one AC bus and the at least one DC bus;
- wherein the at least one CCC and the at least one SCC are coupled in series.

18. The method in accordance with claim 17 further comprising operating the hybrid HVDC converter system during each of predetermined upward and downward transients of the voltage on the at least one AC bus comprising regulating the at least one CCC to induce the first voltage on the at least one DC bus at a value substantially similar to a rated DC bus voltage multiplied by a factor proportional to the real-time magnitude of the measured voltage on the at least one AC bus, and regulating the at least one SCC to induce the second voltage on the at least one DC bus at a residual voltage that is substantially equal to the total DC voltage minus the first voltage, thereby using the at least one SCC to finely regulate at least one of current and voltage on at least one of the at least one AC bus and the at least one DC bus.

19. The method in accordance with claim 17 further comprising operating the hybrid HVDC converter system during transient conditions induced by at least one of an AC fault condition and a DC fault condition comprising regulating the at least one CCC to induce the first voltage on the at least one DC bus at a value substantially similar to a predetermined voltage-dependent-current-order-limit (VDCOL) value, and regulating the at least one SCC to induce the second voltage on the at least one DC bus at a residual voltage that is substantially equal to the total DC voltage minus the first voltage, thereby using the at least one SCC to finely regulate at least one of current and voltage on the at least one AC bus.

20. The method in accordance with claim 17 further comprising operating the hybrid HVDC converter system during at least one of at least one AC bus outage and black start conditions comprising regulating the at least one CCC to generate the first voltage at a value of approximately zero, and regulating the at least one SCC to induce the second voltage on the at least one DC bus such that the total DC voltage is approximately equal to the second voltage, thereby reducing an influence of the at least one CCC to regulate a voltage on the at last one AC bus at a residual voltage that is substantially equal to the total DC voltage.

* * * * *